United States Patent
Jain et al.

(10) Patent No.: US 10,656,859 B2
(45) Date of Patent: May 19, 2020

(54) EFFICIENT DEDUPLICATION FOR STORAGE SYSTEMS

(71) Applicant: Tintri by DDN, Inc., Santa Clara, CA (US)

(72) Inventors: Abhay Kumar Jain, Cupertino, CA (US); Zubin D. Dittia, San Mateo, CA (US); Shobhit Dayal, San Francisco, CA (US)

(73) Assignee: Tintri by DDN, Inc., Santa Clara, CA (US)

(*) Notice: Subject to any disclaimer, the term of this patent is extended or adjusted under 35 U.S.C. 154(b) by 229 days.

(21) Appl. No.: 15/830,352

(22) Filed: Dec. 4, 2017

(65) Prior Publication Data

US 2018/0253255 A1    Sep. 6, 2018

Related U.S. Application Data

(60) Provisional application No. 62/465,525, filed on Mar. 1, 2017.

(51) Int. Cl.

| | |
|---|---|
| *G06F 12/00* | (2006.01) |
| *G06F 13/00* | (2006.01) |
| *G06F 13/28* | (2006.01) |
| *G06F 3/06* | (2006.01) |
| *G06F 11/14* | (2006.01) |
| *G06F 16/13* | (2019.01) |
| *G06F 16/17* | (2019.01) |

(Continued)

(52) U.S. Cl.
CPC .......... *G06F 3/0641* (2013.01); *G06F 3/0608* (2013.01); *G06F 3/0673* (2013.01); *G06F 11/1453* (2013.01); *G06F 16/13* (2019.01); *G06F 16/1727* (2019.01); *G06F 11/1407* (2013.01); *G06F 16/152* (2019.01); *G06F 16/1748* (2019.01); *G06F 2201/805* (2013.01); *G06F 2201/82* (2013.01)

(58) Field of Classification Search
CPC ... G06F 3/0641; G06F 11/1453; G06F 16/174
USPC ........................................... 711/159
See application file for complete search history.

(56) References Cited

U.S. PATENT DOCUMENTS

| | | | |
|---|---|---|---|
| 2008/0294696 A1 | 11/2008 | Frandzel | |
| 2009/0083610 A1* | 3/2009 | Arai ...................... | G06F 3/0608 714/807 |

(Continued)

OTHER PUBLICATIONS

Author Unknown, "Bloom Filters—the math", from http://pages.cs.wisc.edu/~cao/papers/summary-cache/node8.html, captured Nov. 29, 2017.

*Primary Examiner* — Edward J Dudek, Jr.
*Assistant Examiner* — Sidney Li
(74) *Attorney, Agent, or Firm* — Van Pelt, Yi & James LLP

(57) ABSTRACT

Efficient deduplication for storage systems is disclosed, including: using the current data structure to track a set of deduplication data entries associated with a collection group; determining a flush criterion has been met; and storing the set of deduplication data entries of the current data structure as one or more persistent objects associated with the collection group in a persistent storage, wherein the one or more persistent objects are usable to update a set of persistently stored metadata associated with the collection group that tracks deduplication data entries generated before a previous merge operation.

20 Claims, 21 Drawing Sheets

| Collection Group Number | Range of Fingerprints |
|---|---|
| 1 | 00000 - 09999 |
| 2 | 10000 - 19999 |
| 3 | 20000 - 29999 |
| 4 | 30000 - 39999 |
| 5 | 40000 - 49999 |
| 6 | 50000 - 59999 |
| 7 | 60000 - 69999 |
| 8 | 70000 - 79999 |
| 9 | 80000 - 89999 |
| 10 | 90000 - 99999 |

(51) Int. Cl.
  *G06F 16/174* (2019.01)
  *G06F 16/14* (2019.01)

(56) References Cited

U.S. PATENT DOCUMENTS

| | | | |
|---|---|---|---|
| 2011/0055621 A1* | 3/2011 | Mandagere | G06F 11/1435 714/6.3 |
| 2011/0276780 A1* | 11/2011 | Sengupta | G06F 12/0862 711/216 |
| 2011/0282868 A1 | 11/2011 | Ishii | |
| 2012/0131025 A1 | 5/2012 | Cheung | |
| 2014/0310483 A1 | 10/2014 | Bennett | |

* cited by examiner

| Collection Group Number | Range of Fingerprints |
|---|---|
| 1 | 00000 - 09999 |
| 2 | 10000 - 19999 |
| 3 | 20000 - 29999 |
| 4 | 30000 - 39999 |
| 5 | 40000 - 49999 |
| 6 | 50000 - 59999 |
| 7 | 60000 - 69999 |
| 8 | 70000 - 79999 |
| 9 | 80000 - 89999 |
| 10 | 90000 - 99999 |

FIG. 4

EFFICIENT DEDUPLICATION FOR STORAGE SYSTEMS

CROSS REFERENCE TO OTHER APPLICATIONS

This application claims priority to U.S. Provisional Patent Application No. 62/465,525 entitled EFFICIENT DEDUPLICATION FOR HIGH CAPACITY SYSTEMS filed Mar. 1, 2017 which is incorporated herein by reference for all purposes.

BACKGROUND OF THE INVENTION

Deduplication eliminates duplicate copies of data in storage systems and results in significant space saving. Deduplication can be performed at different granularities, such as at the file, block, or byte ("chunk") level. Deduplication at each different granularity has different advantages and shortcomings. For example, chunk level deduplication allows for a high level of deduplication, but it also has relatively high metadata overhead. Similarly, block level deduplication may provide slightly lower deduplication than at the chunk level, but usually has less metadata overhead.

Deduplication generally relies on some sort of fingerprinting technique. For example, if two blocks of data are the same, they will have the same fingerprint. Deduplication mechanisms typically store a fingerprint and a pointer to data that is associated with that fingerprint. A duplicate block is found by comparing its fingerprint with existing fingerprints stored by the system. If such a match is found for a block, that block is determined as a potential candidate for deduplication. If no such match is found, then the block cannot be deduplicated. Such blocks whose fingerprints do not match any existing fingerprints in the system will be written to the storage system and their fingerprints will be added to the fingerprint set to be compared in subsequent matches. In some conventional storage systems, all fingerprints are stored in the main memory of the system. As such, a storage system is required to have enough memory to store all valid fingerprints. Although this conventional scheme works well up to a certain extent, it does not work for high capacity systems. This is because the main memory is much more expensive than the secondary (e.g., persistent) storage and cannot expand at the same scale as the secondary storage. For example, such conventional deduplication techniques were either designed for secondary storage or primarily for hard disk drive (HDD) based storage systems. This design also focused on reducing random accesses to HDD's for the purpose of indexing lookups. This was done by dedicating a very high amount of memory, which is expensive, and also it is not always possible to scale the memory of such storage systems to the size needed for storing deduplication data.

One approach to solving this would be to create a B-Tree/radix tree of fingerprints, store the first few levels of the tree(s) (that include fingerprint prefixes) in main memory, and load subsequent levels from persistent storage on demand. In this approach, the top level of the tree(s) may only indicate that a fingerprint with a certain prefix is present within the storage system, but does not indicate anything about the full fingerprint. In such schemes, the loading of leaf level pages from the persistent storage is often required to determine if the desired fingerprint is present at the storage system. Searches for multiple fingerprints will usually traverse different leaf pages and result in significant IO overhead associated with loading deduplication data from the persistent storage into the main memory.

BRIEF DESCRIPTION OF THE DRAWINGS

Various embodiments of the invention are disclosed in the following detailed description and the accompanying drawings.

FIG. 4 is a diagram showing a mapping of fingerprint ranges to corresponding collection groups.

DETAILED DESCRIPTION

Figure 1:
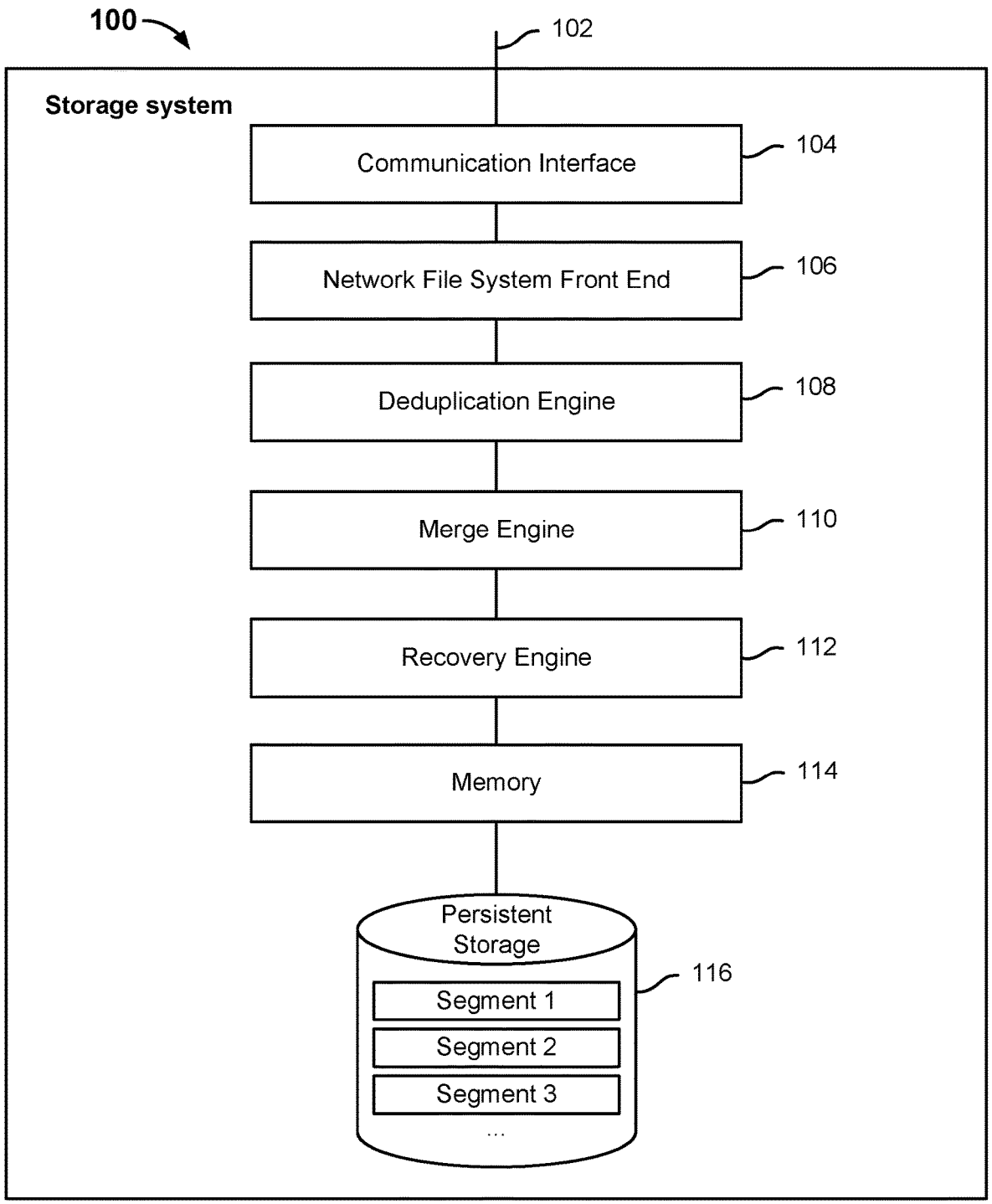
FIG. 1 is a diagram showing a system for performing efficient deduplication and performing efficient recovery of deduplication data during recovery after a system crash.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A first challenge in designing a deduplication system in a storage system is the large number of data blocks that are stored by the storage system. Given a large number of blocks in the system, efficiently searching for a candidate stored data block to deduplicate with and without incurring a high latency is a challenge. Conventional systems sometimes reduce the latency associated with searching for a candidate stored data block against which to deduplicate a new data block by caching a large part of the fingerprints of stored data blocks in memory to avoid performing multiple IO's to HDD to load more fingerprints of stored data blocks. However, caching a large part of the fingerprints of stored data blocks in memory can be expensive and without the memory caching optimization, independent random IO's to HDD for fingerprint lookups can undermine the performance of the entire system.

A second challenge in designing a deduplication system in a storage system is the efficient merging of new fingerprints associated with newly stored data blocks with previously stored fingerprints associated with previously stored data blocks. Conventional systems try to manage the process of merging new information with old information in bulk operations so as to keep all the index data together (co-located). This is more efficient for an HDD-based system, and in general, reduces the effort of managing metadata.

A third challenge in designing a deduplication system in a storage system is the efficient recovery of deduplication data after a system crash. After the storage system crashes, efficiently rebuilding the state that was cached in memory may be difficult. For example, the fingerprint information of a newly arrived block may be cached in memory but may not get merged into the persistent copy of the index before the crash occurs and is therefore lost after the crash. A future copy of the same data block will also lose the opportunity to deduplicate against the previous copy since the previous fingerprint is lost from memory after the crash. As a result, in conventional systems, in some cases, a redundant data block is stored because the storage system cannot deduplicate the data block against the corresponding fingerprint that was lost from the memory when the storage system crashed.

Embodiments of efficient deduplication for storage systems are described herein. A current data structure, which is used to track a set of deduplication data entries associated with a collection group, is stored in memory. In some embodiments, a current data structure is referred to as a "current delta page." In various embodiments, a deduplication data entry comprises at least a fingerprint or some other data pattern that is derived from a data block and is used to identify multiple instances of the same data block. In various embodiments, a data block is sometimes referred to as a "data storage block." For example, a new data block that is requested to be written to the storage system is determined to not match a data block that has already been stored by the storage system (because there is no matching fingerprint in a deduplication data entry) and therefore, a new deduplication data entry that includes the fingerprint of the new data block is stored in the current data structure of the relevant collection group. In various embodiments, deduplication data entries are sorted into collection groups, where the deduplication data entries that belong to the same collection group share at least one common attribute. In some embodiments, the at least one common attribute shared by deduplication data entries belonging to the same collection group is that all the fingerprints belonging to the same collection group share the same prefix value (or suffix value). A flush criterion associated with flushing the new deduplication data entries stored in the current data structure to persistent storage is determined to have been met. For example, the flush criterion is the current data structure being full of the new deduplication data entries. In response to the determination that the flush criterion has been met, the new deduplication data entries of the current data structure in memory are stored as one or more persistent objects associated with the collection group in a persistent storage. In various embodiments, the persistent storage comprises solid state drive (SSD). In some embodiments, a persistent object is referred to as a "persistent delta page." The one or more persistent objects associated with the collection group track new deduplication data entries belonging to the collection group that have been generated since a previous merge operation. The one or more persistent objects associated with the collection group are usable to update a set of persistently stored metadata belonging to the collection group. In some embodiments, a set of persistently stored metadata is referred to as a set of "persistent bucket pages." The set of persistently stored metadata belonging to the collection group tracks deduplication data entries belonging to the collection group that have been generated before the previous merge operation. In various embodiments, a merge operation, which is periodically performed and/or in response to an occurrence of a merge event, merges the new deduplication data entries that are stored in either the current data structure and/or the one or more persistent objects associated with a collection group with the previously stored deduplication data entries that are stored in the set of persistently stored metadata belonging to the same collection group.

Embodiments of efficient recovery of deduplication data during recovery after a system crash are described herein. A data structure that tracks a plurality of segments to which a plurality of persistent objects have been recently written is read from a data storage device. The segment numbers of segments to which persistent objects are written increase in a monotonic numerical order. A checkpoint segment is selected from among the plurality of segments. All persistent objects written to segments up to the checkpoint segment have been stored safely onto persistent storage. The checkpoint segment and a segment associated with a latest available segment number are used to determine a set of candidate segments. At least a portion of the set of candidate segments is read to identify a data storage block for which a corresponding deduplication data entry is not already stored in persistently stored deduplication data entries.

For illustrative purposes, "deduplication" as used in the remainder of the document refers to deduplication at the data block level, although in practice, the techniques described herein may apply to deduplication at other granularities (e.g., byte-level or file-level) as well.

FIG. 1 is a diagram showing a system for performing efficient deduplication and performing efficient recovery of deduplication data during recovery after a system crash. In the example shown, storage system 100 includes a network connection 102 and a communication interface 104, such as a network interface card or other interface, which enable the storage system to be connected to and communicate via a network. The storage system 100 further includes network file system front end 106 configured to handle NFS requests from applications and/or virtual machines running on one or more servers.

Memory 114 is configured to store current data structures (current delta pages) of new deduplication data entries corresponding to respective collection groups. A current delta page stores new deduplication data entries belonging to a corresponding collection group, which is a logical unit that includes deduplication data entries that share a common attribute. The deduplication data entries stored in a current delta page corresponding to a collection group are "new" in the sense that they have been generated since the last/previous merge operation took place for that collection group. New deduplication data entries in a current delta page of a collection group include entries that indicate to insert/add the fingerprints (e.g., SHA1s) of new data blocks that have been stored at storage system 100 (e.g., persistent storage 116) and/or entries that indicate to delete existing persistently stored fingerprints of data blocks that have been deleted or marked for reclamation at storage system 100 (e.g., persistent storage 116). The new deduplication data entries stored in a current delta page may be quickly accessed (e.g., during a process of deduplicating a new data block, as will be described below) by virtue of being stored in memory 114 and in response to a flush criterion being met, the new deduplication data entries of the current delta page will be flushed as one or more persistent objects (persistent delta pages) on persistent storage 116.

In addition to the current delta pages corresponding to various collection groups, in some embodiments, memory 114 is also configured to store bloom filters. Specifically, in some embodiments, memory 114 is configured to store a bloom filter for each current delta page corresponding to an associated collection group, a bloom filter for each persistent delta page corresponding to an associated collection group, and a bloom filter for a set of persistently stored metadata (one or more persistent bucket pages) corresponding to an associated collection group. A bloom filter comprises a space-efficient probabilistic data structure. In various embodiments, a bloom filter that corresponds to a certain data structure used for storing deduplication data entries (e.g., current delta page, persistent delta page, or persistent bucket page(s)) is configured to be updated whenever a new deduplication data entry is added to that data structure such that at least a portion of a fingerprint of a data block can be input into the bloom filter to determine whether a matching fingerprint is stored at the corresponding other data structure. One advantage of a bloom filter is that when a bloom filter indicates the presence of an entry of a fingerprint, there is a very high chance that an entry is present in the corresponding data structure (e.g., current delta page, persistent delta page, or persistent bucket page(s)). Furthermore, another advantage of the bloom filter is that a bloom filter can certainly (with a 100% confidence level) indicate the absence of a fingerprint in the corresponding data structure. As such, during a process of deduplicating a new data block, the bloom filter of each corresponding data structure (e.g., current delta page, persistent delta page, or persistent bucket page(s)) can be quickly checked before determining whether it is appropriate to load the corresponding data structure(s) from persistent storage into memory to check the corresponding data structures themselves for the presence of a fingerprint in question.

Persistent storage 116 is configured to store one or more persistent objects (persistent delta pages) corresponding to respective collection groups. The deduplication data entries stored in a persistent delta page corresponding to a collection group are "new" in the sense that they have been generated since the last/previous merge operation took place for that collection group. In various embodiments, the persistent object(s) corresponding to a collection group are configured to store new deduplication data entries that were previously stored in the current delta page corresponding to the collection group. As mentioned above, in response to a flush criterion being met, the new deduplication data entries stored in a current delta page corresponding to a collection group are stored as one or more persistent delta pages corresponding to the collection group in persistent storage 116 and the current delta page is cleared and the bloom filter corresponding to that current delta page is deleted. In some embodiments, a new bloom filter is generated for each newly generated persistent delta page based on the new deduplication data entries that are stored in that particular persistent delta page. In various embodiments, unlike the persistent delta page on which it was based, the bloom filter is stored in memory 114 so that the bloom filter could be quickly checked before determining whether a costly IO operation is needed to load the corresponding persistent delta page from persistent storage 116 into memory 114. New deduplication data entries that are stored across the current delta page in memory 114 and the one or more persistent delta pages in persistent storage 116 corresponding to a collection group form the set of new deduplication data entries that have been generated for the collection group since the occurrence of a last/previous merge operation for that collection group.

Persistent storage 116 is further configured to store sets of persistently stored metadata (persistent bucket pages) corresponding to respective collection groups. A set of persistent bucket pages corresponding to a collection group store deduplication data entries that have been generated for the collection group before the occurrence of a last/previous merge operation for that collection group.

In various embodiments, persistent storage 116 comprises SSD and/or another type of storage medium (e.g., HDD). One advantage of using SSD to implement persistent storage 116 is that performing random read accesses (e.g., to access persistent delta pages and/or persistent bucket pages) is much cheaper to perform on SSD than on HDD. For example, if persistent delta pages for a collection group are scattered throughout the logical space of the SSD, then random read accesses to the SSD would be comparatively cheaper than if the same reads were performed on the HDD. As shown in FIG. 1, persistent storage comprises multiple segments. In various embodiments, segments are logical entities and are striped across a number of drives. The segments shown within persistent storage 116 are each assigned a number. Segment numbers are written to in a monotonically increasing manner. For example, Segment 1 is written to before Segment 2 is written to, Segment 2 is written to before Segment 3 is written to, etc.

In response to a determination of a merge event associated with a collection group, merge engine 110 is configured to merge the new deduplication data entries that are stored across the current delta page in memory 114 and the one or more persistent delta pages in persistent storage 116 corresponding to that collection group, with the existing deduplication data entries stored in the persistent bucket pages in persistent storage 116 corresponding to that collection group. For example, a merge event may comprise the elapse of a predetermined time interval since a previous merge operation and/or the presence of a predetermined number of persistent delta pages for a collection group. Merging new deduplication data entries with the existing deduplication data entries stored in the persistent bucket pages in persistent storage 116 corresponding to the same collection group comprises adding new deduplication data entries associated with newly stored physical data blocks (e.g., stored at persistent storage 116 or at another storage of storage system 100 that is not shown) to and/or deleting deduplication data entries associated with newly deleted physical data blocks from the existing deduplication data entries stored in the persistent bucket pages in persistent storage 116. Merge engine 110 then writes the merged deduplication data entries corresponding to a collection group as one or more new persistent bucket pages corresponding to the collection group in persistent storage 116. In various embodiments, after a merge operation has been completed for a collection group, merge engine 110 is configured to delete (or mark for reclamation) the current delta page corresponding to the collection group in memory 114, delete the bloom filter corresponding to the current delta page in memory 114, delete (or mark for reclamation) the one or more persistent delta pages corresponding to the collection group in persistent storage 116, delete (or mark for reclamation) the bloom filters corresponding to the one or more persistent delta pages in memory 114, delete (or mark for reclamation) the one or more persistent bucket pages corresponding to the collection group in persistent storage 116, and delete (or mark for reclamation) the bloom filters corresponding to the one or more persistent bucket pages in memory 114. In various embodiments, after a merge operation has been completed for a collection group, merge engine 110 is further configured to generate a new bloom filter corresponding to the new persistent bucket pages of the collection group based on the newly merged deduplication data entries stored in such new persistent bucket pages, and store the new bloom filter in memory 114.

In various embodiments, network file system front end 106 is configured to receive a request over network 102 to write a new data block, read a data block, update a data block, and/or delete a data block. Deduplication engine 108 is configured to determine a fingerprint corresponding to the data block associated with the request and compare the fingerprint to fingerprints of the deduplication data entries stored in memory 114 and/or persistent storage 116 to determine whether there is a match. In various embodiments, a fingerprint corresponding to a data block that is requested to be written is determined based on a hash of at least a portion of the data block. For example, a fingerprint comprises an SHA1 of a data block. In various embodiments, deduplication engine 108 is configured to first determine a collection group to which the new fingerprint corresponding to the data block associated with the request belongs. Next, deduplication engine 108 is configured to input at least a portion of the new fingerprint into the bloom filter stored in memory 114 corresponding to the current delta page corresponding to the determined collection group to determine whether the new fingerprint is present among the new deduplication data entries stored in the current delta page. If the new fingerprint is not found among the new deduplication data entries stored in the current delta page, deduplication engine 108 is configured to input at least a portion of the new fingerprint into the bloom filter stored in memory 114 corresponding to the most recently generated persistent delta page corresponding to the determined collection group to determine whether the new fingerprint is present among the new deduplication data entries stored in that persistent delta page. If the new fingerprint is not found among the new deduplication data entries stored in the most recently generated persistent delta page, deduplication engine 108 is configured to input at least a portion of the new fingerprint into the bloom filter stored in memory 114 corresponding to the second most recently generated persistent delta page corresponding to the determined collection group to determine whether the new fingerprint is present among the new deduplication data entries stored in that persistent delta page, and so forth. If the new fingerprint is not found among the existing deduplication data entries stored in any of the persistent delta pages, deduplication engine 108 is configured to input at least a portion of the new fingerprint into the bloom filter stored in memory 114 corresponding to the persistent bucket pages corresponding to the determined collection group to determine whether the new fingerprint is present among the new deduplication data entries stored in those persistent bucket page(s). In the event that a matching deduplication fingerprint is found in any of the deduplication data entries stored in the current delta page, a persistent delta page, or a persistent bucket page, deduplication engine 108 is configured to determine that the data block that is requested to be written is a duplicate/copy of a data block that is already stored at a physical storage (e.g., persistent storage 116) of storage system 100 and therefore, writes a (e.g., lightweight) representation of the data block to a data structure of a file to which the data block is requested to be written and does not redundantly store the underlying data block to the physical storage. In the event that a matching deduplication fingerprint is not found in any of the deduplication data entries stored in the current delta page, a persistent delta page, or a persistent bucket page, deduplication engine 108 is configured to determine that the block that is requested to be written is not a duplicate/copy of a data block that is already stored at a physical storage (e.g., persistent storage 116) of storage system 100 and instead writes the underlying data block to the physical storage, writes a (e.g., lightweight) representation of the data block to a data structure of a file to which the data block is requested to be written, and also stores the new fingerprint in a new deduplication data entry in the current delta page stored in memory 114 corresponding to the determined collection group. In some embodiments, deduplication engine 108 is configured to update a bloom filter corresponding to the current delta page stored in memory 114 corresponding to the determined collection group based on the added new deduplication data entry.

In response to a determination that a flush criterion associated with a current delta page corresponding to a collection group has been met, in some embodiments, deduplication engine 108 is configured to store the new deduplication data entries of the current delta page as one or more persistent delta pages in persistent storage 116 corresponding to the collection group and generate in memory 114 a bloom filter corresponding to each persistent delta page based on the new deduplication data entries stored in that persistent delta page.

Recovery engine 112 is configured to perform recovery of new deduplication data entries that were lost from current delta pages stored in memory 114 during a crash or shutdown event of storage system 100. Unlike the deduplication data entries that are stored (e.g., in persistent delta pages and persistent bucket pages) in persistent storage 116, new deduplication data entries that are stored in memory 114 will be lost when storage system 100 crashes. Conventionally, such new deduplication data entries are costly to recover or not recovered at all. In various embodiments, recovery engine 112 is configured to perform efficient recovery of the new deduplication data entries that are lost from memory 114 through the use of one or more data structures. Specifically, in various embodiments, recovery engine 112 leverages the use of at least one of a collection group address data structure and a current delta page flush data structure. In various embodiments, a collection group address data structure stores the addresses in either memory 114 or persistent storage 116 of the various data structures that store deduplication data entries (e.g., current delta pages, persistent delta pages, persistent bucket pages, and the bloom filters corresponding to each such data structure) corresponding to various collection groups. In various embodiments, a current delta page flush data structure tracks the number of persistent delta pages that have been written for each collection group and also the segment number to which the latest persistent delta page corresponding to that collection group has been written. After storage system 100 restarts after a crash, recovery engine 112 is configured to use at least one of the collection group address data structure and the current delta page flush data structure to identify the locations of the various data structures that store deduplication data entries (e.g., current delta pages, persistent delta pages, persistent bucket pages, and the bloom filters corresponding to each such data structure) corresponding to various collection groups to identify a subset of segments to scan to determine lost new deduplication data entries pertaining to inserting new fingerprints and/or to determine lost new deduplication data entries pertaining to deleting existing fingerprints, as will be described in further detail below. Recovery engine 112 stores the recovered new deduplication data entries corresponding to each collection group into a current delta page corresponding to that collection group in memory 114.

In some embodiments, at least some of the functionalities of deduplication engine 108, merge engine 110, recovery engine 112, and memory 114 described above may be implemented by one or more processors (not shown).

Figure 2:
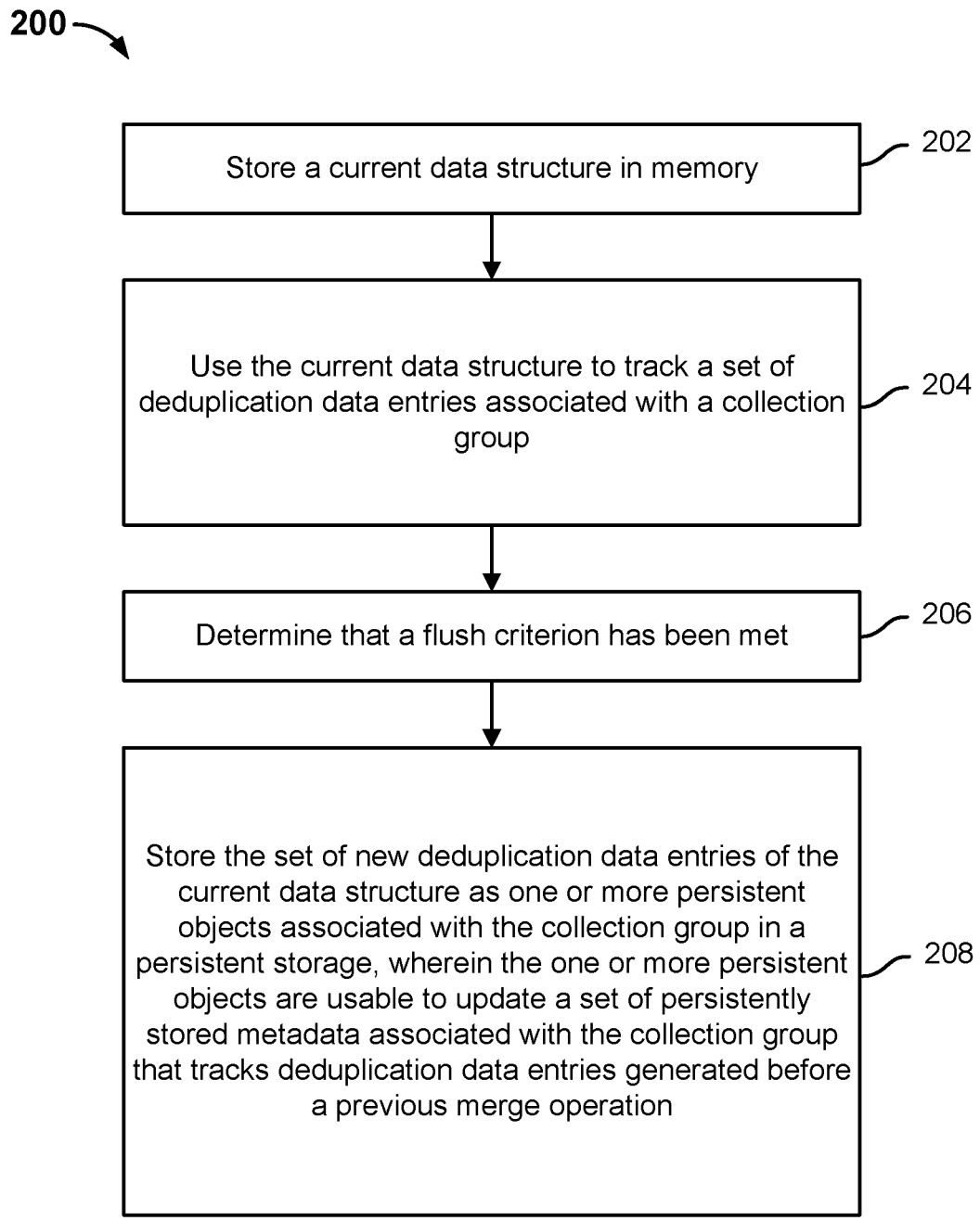
FIG. 2 is a flow diagram showing an embodiment of a process for efficient deduplication for storage systems.

FIG. 2 is a flow diagram showing an embodiment of a process for efficient deduplication for storage systems. In some embodiments, process 200 is implemented at a storage system such as storage system 100 of FIG. 1.

At 202, a current data structure is stored in memory. In some embodiments, a current data structure stored in memory is referred to as a "current delta page." In some embodiments, a current delta page exists in memory for each collection group. In some embodiments, a current data structure comprises a buffer in memory.

At 204, the current data structure is used to track a set of deduplication data entries associated with a collection group. In various embodiments, each new deduplication data entry stored in the current data structure comprises a fingerprint or other identifying information that is derived from at least a portion of a data block (or other granularity of data such as a byte or a chunk), and a flag/marker of whether the fingerprint should be added/inserted or deleted from the set of deduplication fingerprints that are currently persistently stored for the collection group since the previous merge operation. In various embodiments, a deduplication fingerprint is classified into a collection group based on at least a portion of the fingerprint. In various embodiments, fingerprints that belong to the same collection group share a common attribute, such as a common prefix value, for example. For example, fingerprints that start with the value of "0" are classified into a first collection group, fingerprints that start with the value of "1" are classified into a second collection group, and so forth.

In some embodiments, a new deduplication data entry to add/insert a fingerprint to persistent storage is generated and stored/cached in the current data structure when the fingerprint (e.g., that is derived from a new data block to be written to a file) does not match an existing fingerprint that is either stored in memory or persistent storage for deduplication purposes. In some embodiments, a new deduplication data entry to delete a fingerprint from persistent storage is generated and stored/cached in the current data structure when the fingerprint (e.g., that is derived from a data block to be deleted from a file) matches an existing fingerprint that is either stored in memory or persistent storage for deduplication purposes.

In some embodiments, a bloom filter that is configured based on the new deduplication data entries of each current data structure is stored in memory. In some embodiments, before the current data structure is checked for a certain fingerprint, the bloom filter corresponding to that current data structure is first checked to determine whether there is a greater than zero likelihood that the fingerprint in question is in that current data structure. Performing a check at a bloom filter is faster than checking the corresponding current data structure and may prevent an unnecessary check to the current data structure from being performed if the bloom filter indicates that a fingerprint in question is not in that current data structure.

At 206, a flush criterion is determined to have been met. When a flush criterion is met for a collection group, the new deduplication data entries that are stored in a current data structure in memory for the collection group are flushed from memory and stored in persistent storage. For example, a flush criterion is if a current data structure is full of new deduplication data entries or if a predetermined time interval since a previous flushing of new deduplication data entries from the current data structure has elapsed. In various embodiments, the persistent storage to which the new deduplication data entries are flushed comprises SSD type of storage medium.

In some embodiments, one or more flush criteria are configured. In some embodiments, different flush criteria can be configured for different collection groups. In some embodiments, the same flush criterion can be configured for all collection groups.

At 208, the set of deduplication data entries of the current data structure is stored as one or more persistent objects associated with the collection group in a persistent storage, wherein the one or more persistent objects are usable to update a set of persistently stored metadata associated with the collection group that tracks deduplication data entries generated before a previous merge operation.

The new deduplication data entries of the current data structure corresponding to a collection group are flushed to the persistent storage as one or more persistent objects. In some embodiments, a persistent object is referred to as a "persistent delta page." In various embodiments, a persistent "page" is a unit of management for storage. In some embodiments, the new deduplication data entries of a current data structure corresponding to a collection group are flushed to persistent storage by first sorting the new deduplication data entries and then writing the sorted new deduplication data entries as a new persistent object. In various embodiments, flushing the new deduplication data entries of a current data structure to persistent storage includes deleting such deduplication data entries from memory and also deleting the bloom filter corresponding to that current data structure from memory.

By flushing the new in-memory deduplication data entries of a collection group to persistent storage in response to a flush criterion being met keeps the number of deduplication data entries that are cached in memory for the collection group to a limited amount (e.g., the capacity of the current data structure). Maintaining some of the new deduplication data entries of a collection group in memory (in the current data structure) but also persistently storing such new deduplication data entries over time provides a balance between providing faster accesses to new deduplication data entries in memory and making sure that only a limited number of new deduplication data entries can be lost from memory at a time due to a system crash.

In some embodiments, a bloom filter that is configured based on the new deduplication data entries of each persistent object is stored in memory. In some embodiments, before each persistent object is checked for a certain fingerprint, the bloom filter corresponding to that persistent object is first checked to determine whether there is a greater than zero likelihood that the fingerprint in question is in that persistent object. Performing a check at a bloom filter is faster than checking the corresponding persistent object and may prevent an unnecessary check to the persistent object from being performed if the corresponding bloom filter indicates that a fingerprint in question is not in that persistent object.

In various embodiments, a merge event for a collection group is detected by the storage system (or another entity) and in response to the merge event, a merge operation is performed to merge the new deduplication data entries that are stored in the current data structure and the persistent object(s) of the collection group with the existing deduplication data entries of a set of persistently stored metadata for the collection group. For example, a merge event for a collection group is that a predetermined number of persistent objects have been generated for the collection group since the previous merge operation or that a predetermined time interval has elapsed since the occurrence of the previous merge operation. In some embodiments, the set of persistently stored metadata is referred to as a set of "persistent bucket pages." In various embodiments, merging the new deduplication data entries that are stored in the current data structure and the persistent object(s) of the collection group with the existing deduplication data entries of a set of persistently stored metadata for the collection group comprises adding one or more new deduplication data entries with new fingerprints (of new data blocks that were stored to the underlying physical storage) to the set of persistently stored metadata and/or deleting one or more deduplication data entries with previously stored fingerprints (of data blocks that have been deleted from the underlying physical storage). After a merge operation is completed for a collection group, the current data structure corresponding to the collection group is cleared, the bloom filter corresponding to the collection group is deleted, the one or more persistent objects corresponding to the collection group are deleted, and the bloom filters corresponding to respective ones of the one or more persistent objects are deleted.

In some embodiments, one or more merge events are configured. In some embodiments, different merge events can be configured for different collection groups. In some embodiments, the same flush merge events can be configured for all collection groups.

As such, with each merge operation, all the new deduplication data entries that have been generated and stored in either the current data structure or persistent object(s) for a collection group since a previous merge operation are merged into the existing deduplication data entries of the set of persistently stored metadata and new deduplication data entries relative to the latest merge operation are allowed to accumulate in the current data structure and/or persistent object(s) until the next merge operation.

In some embodiments, a bloom filter that is configured based on the deduplication data entries of each set of persistently stored metadata for a collection group is stored in memory. In some embodiments, before the set of persistently stored metadata is checked for a certain fingerprint, the bloom filter corresponding to that set of persistently stored metadata is first checked to determine whether there is a greater than zero likelihood that the fingerprint in question is in that set of persistently stored metadata. Performing a check at a bloom filter is faster than checking the corresponding set of persistently stored metadata and may prevent an unnecessary check to the set of persistently stored metadata from being performed if the bloom filter indicates that a fingerprint in question is not in that set of persistently stored metadata.

Figure 3:
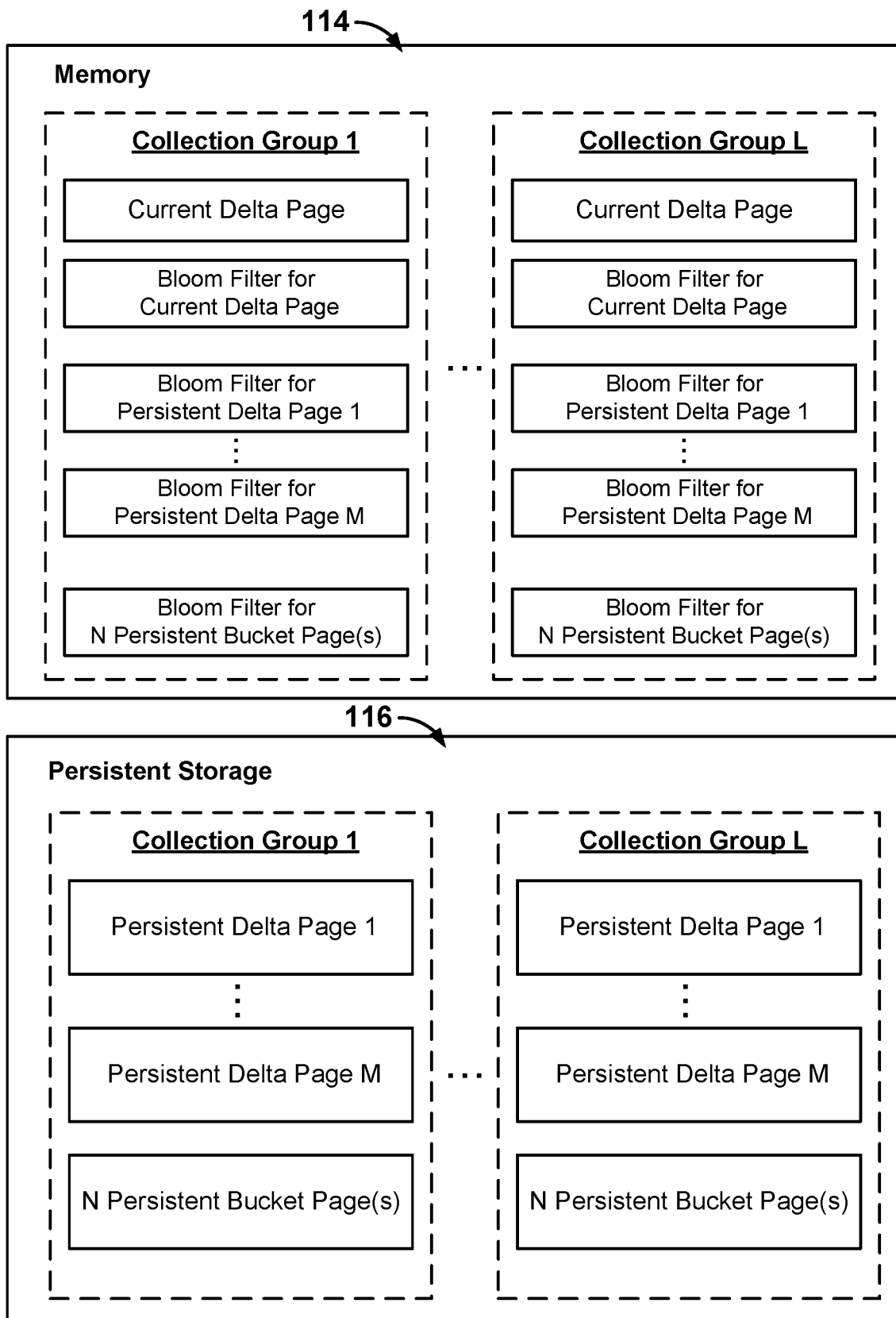
FIG. 3 is a diagram showing an example of a memory and a persistent storage that are part of a storage system.

FIG. 3 is a diagram showing an example of a memory and a persistent storage that are part of a storage system. In some embodiments, memory 114 of storage system 100 of FIG. 1 may be implemented using the example memory shown in FIG. 3. In some embodiments, persistent storage 116 of storage system 100 of FIG. 1 may be implemented using the example memory shown in FIG. 3. In FIG. 3, a set of data structures corresponding to each collection group (Collection Group 1 through Collection Group L) is shown to be stored in the memory. In the memory, for each collection group, a current delta page, a bloom filter corresponding to the current delta page, a bloom filter corresponding to each persistent delta page (Persistent Delta Page 1 through Persistent Delta Page M), and a bloom filter corresponding to the set of N Persistent Bucket Page(s) are stored. In FIG. 3, a set of data structures corresponding to each collection group (Collection Group 1 through Collection Group L) is also shown to be stored in the persistent storage. In the persistent storage, for each collection group, M Persistent Delta Pages and N Persistent Bucket Pages are stored. As such, data structures for storing deduplication data entries associated with each collection group are stored across both the memory and the persistent storage. As described above, new deduplication data entries for a collection group are initially cached in the collection group's current delta page in memory. Once a flush criterion is met for the collection group, the new deduplication data entries for the collection group are flushed to the persistent storage as one or more persistent delta pages. Furthermore, in response to an occurrence of a merge event, the new deduplication data entries for the collection group that are currently stored in the current delta page and the persistent delta pages of the collection group are merged with the existing deduplication data entries in the collection group's persistent bucket page(s). In various embodiments, all deduplication data entries in the same persistent bucket page have some common properties. For example all fingerprints that belong to the same persistent bucket page share the same prefix. At least one bloom filter is configured and stored in the memory for each different type of data structure (current delta page, persistent delta page, and persistent bucket page) to speed up the search for a particular fingerprint in the corresponding data structure.

As will be described in further detail below, one advantage of classifying deduplication fingerprints into collection groups is that the search for whether a fingerprint is already stored (whether in memory or persistent storage) can be limited to one collection group out of multiple collection groups to thereby reduce the scope of each search. Another advantage of classifying deduplication fingerprints into collection groups is to allow costly merge operations to be performed on the unit or basis of a single collection group, which reduces the cost and also increases the speed at which a merge operation can be completed. Also, in various embodiments, the persistent storage is implemented using at least SSD so that random accesses to the storage medium to load persistent delta pages and/or persistent bucket pages (e.g., to perform a merge operation or to perform a search of a persistent page) are less expensive than if the persistent storage had been implemented on HDD.

FIG. 4 is a diagram showing a mapping of fingerprint ranges to corresponding collection groups. As described above, a fingerprint is first classified into a corresponding collection group before it is stored in a corresponding deduplication data entry. In various embodiments, a collection group comprises a logical unit of fingerprints that share a common attribute. In various embodiments, a fingerprint is a value that is derived from a data block and can be used to identify that data block. For example, a fingerprint is a hash value that is determined using the data block. Specifically, for example, a fingerprint is an SHA1 of a data block. In the example of FIG. 4, fingerprints that share the same first value are classified into the same collection group. As shown in the table that maps fingerprint ranges to corresponding collection groups, all fingerprints that are found in the range of "00000" to "09999" belong to Collection Group 1, all fingerprints that are found in the range of "10000" to "19999" belong to Collection Group 2, all fingerprints that are found in the range of "20000" to "29999" belong to Collection Group 3, and so forth. As will be described in further detail below, before a fingerprint associated with a data block associated with a new (e.g., write) request is searched among fingerprints stored in deduplication data entries, the collection group to which that fingerprint belongs is first checked, using a mapping table such as the example shown in FIG. 4, such that the subsequent search can be limited to only those deduplication data structures (e.g., current delta page, persistent delta page(s), and persistent bucket page(s)) that correspond to that particular collection group. Furthermore, as will be described in further detail below, a merge operation occurs on a unit or basis of a collection group so that the costly operation can be performed on a subset of all fingerprints at a time to therefore increase the speed at which each merge operation is completed.

Figure 5:
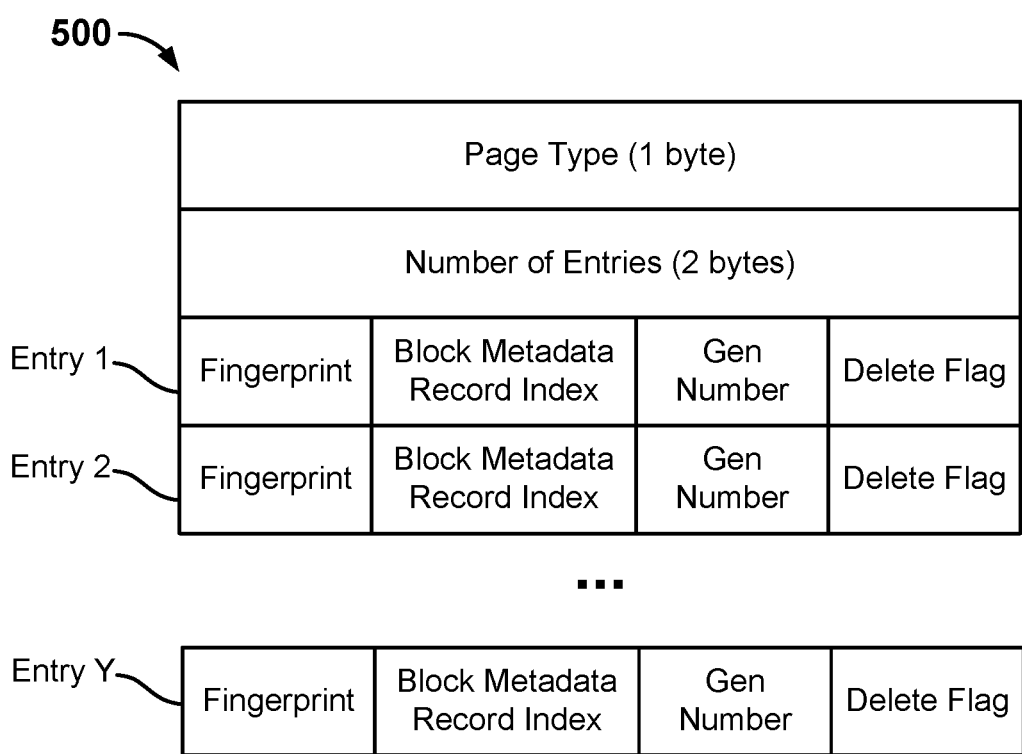
FIG. 5 is a diagram showing an example layout of a persistent data structure for tracking deduplication data entries.
Figure 6:
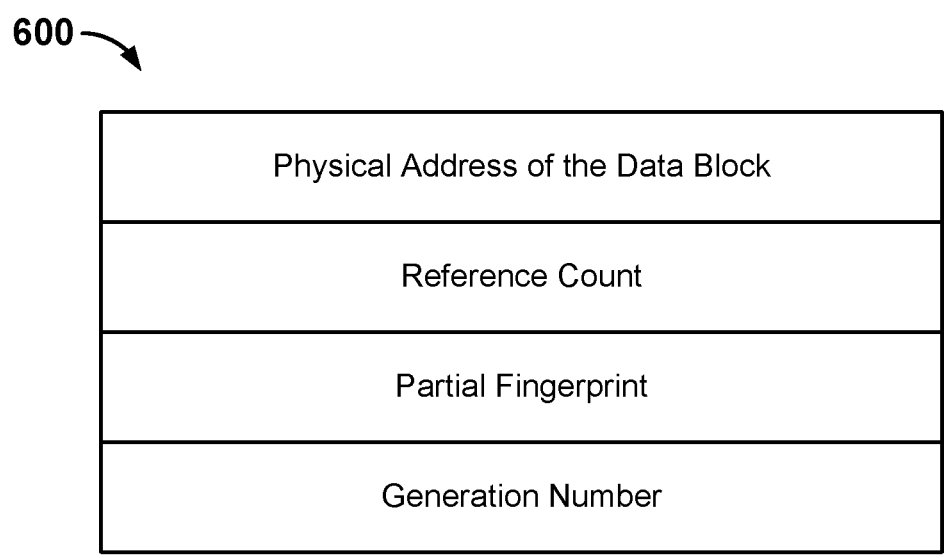
FIG. 6 is a diagram showing an example layout of a block metadata record.

FIG. 5 is a diagram showing an example layout of a persistent data structure for tracking deduplication data entries. In some embodiments, a persistent data structure such as a persistent delta page or a persistent bucket page can be implemented using layout 500. Layout 500 includes fields such as "Page Type," "Number of Entries," and one or more deduplication data entries (each labeled as "Entry 1," "Entry 2," . . . etc.). The "Page Type" field may store a value that indicates whether the persistent data structure is a persistent delta page or a persistent bucket page. The "Number of Entries" field may store a value that indicates the number of deduplication data entries that are stored in the persistent data structure. Each deduplication data entry comprises the fields "Fingerprint," "Block Metadata Record Index," "Gen Number," and "Delete Flag." The "Fingerprint" field in each deduplication data entry may store the full fingerprint (e.g., full SHA1) of a data block. The fingerprint stored in a "Fingerprint" entry can be used to identify the collection group to which the persistent data structure belongs. The "Block Metadata Record Index" field in each deduplication data entry may be a reference (e.g., pointer) to a block metadata record, which is another data structure. In some embodiments, a "block metadata record" comprises a data structure that points to/stores the physical address at which a corresponding data block is stored at the underlying storage medium (e.g., persistent storage such as SSD or HDD). An example of a layout of a block metadata record is shown in FIG. 6, below. As such, in some embodiments, a portion of a representation of a file that is associated with a data block stores a reference (e.g., pointer) to the block metadata record that stores the physical address at which the data block is stored at the underlying storage medium instead of directly storing the physical address of the location at which the data block is stored. In various embodiments, a block metadata record can be reused to store the physical addresses at which different data blocks are stored. Each time that a block metadata record is reused, its generation number increments by one. The "Gen Number" field in each deduplication data entry may store a value that denotes the current generation (instance of the use) of the block metadata record that is referenced in the same deduplication data entry. The "Delete Flag" may store a value that indicates whether the fingerprint stored in the same deduplication data entry should be removed from persistent storage for the collection group (e.g., because the data block from which the fingerprint was derived is no longer referenced by any files and/or the data block has been deleted from the underlying storage).

FIG. 6 is a diagram showing an example layout of a block metadata record. Block metadata record 600 includes fields such as "Physical Address of the Data Block," "Reference Count," "Partial Fingerprint," and "Generation Number." In various embodiments, block metadata records such as block metadata record 600 are stored on persistent storage. The "Physical Address of the Data Block" field may store a value that represents the physical address of the location at which a data block is stored at the underlying storage. The "Reference Count" field may store a value that represents the number of files or locations within files that reference (e.g., point to) the physical address of the location at which the data block is stored at the underlying storage by storing references (e.g., pointers) to block metadata record 600, which stores the physical address of the location at which that data block is stored at the underlying storage. The "Reference Count" is incremented when a new portion of a file references the block metadata record and the "Reference Count" is decremented when a portion of a file removes its reference to the block metadata record. One advantage of using the block metadata record as an indirect reference to the physical address of the location at which a data block is stored is that the block metadata record may store additional information for that data block such as the reference count. When the reference count decrements to a predetermined value (e.g., zero), it can be determined that the data block can be safely reclaimed/deleted off the underlying storage. The "Partial Fingerprint" field may store a portion of the fingerprint of the data block. The "Generation Number" field may store the current generation of the block metadata record.

When a data block is written, a block metadata record is allocated and assigned to this block. The block metadata will be associated with this data block till it gets overwritten or deleted. After the data block is overwritten or deleted, this block metadata record is freed and goes back to the pool. Now when a new data block is written, this block metadata record may be assigned to store information about the new data block and the block metadata record's generation number is incremented (e.g., by 1). The above example illustrates how a block metadata can get re-assigned or re-purposed for a different data block after the previous data block becomes invalid due to deletion or overwrite.

In some embodiments, a persistent data structure (for which an example is shown in FIG. 5) records a block metadata record index that does not change when the block metadata record is reassigned to a new data block, and so the similar fields ("Fingerprint"/"Partial Fingerprint" and "Generation Number") that are included in a block metadata record and a persistent data structure may be compared and the discrepancies, if any, can be used to determine whether the block metadata record has been reassigned to a new data block since being referenced by the persistent data structure. Whether a block metadata record that is referenced by a persistent data structure has been reassigned to a new data block, one that is not referenced by the persistent data structure, is used to recover deduplication data deletion entries that are lost from the memory during a storage system crash, as will be described in detail further below.

Figure 7:
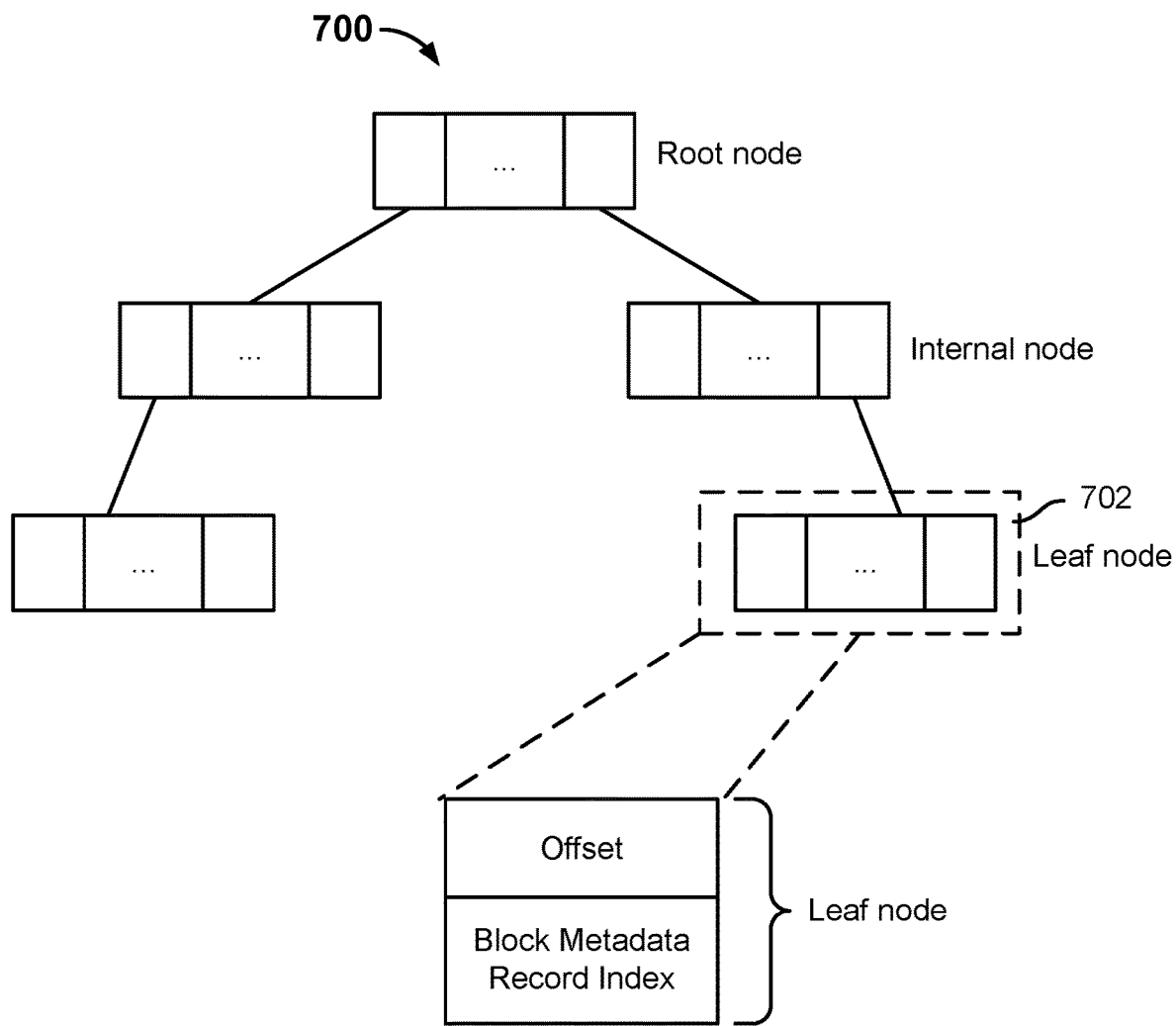
FIG. 7 is a diagram showing an example representation of a file in accordance with various embodiments.

FIG. 7 is a diagram showing an example representation of a file in accordance with various embodiments. In the example of FIG. 7, file 700 is represented as a hierarchy/tree (e.g., a B+tree) of nodes. The top node of the hierarchy is referred to as the "root node" and the nodes at the bottom of the hierarchy are referred to as "leaf nodes." Intermediate nodes in between the root node and the leaf nodes are referred to as "internal nodes." Each leaf node, such as leaf node 702, comprises at least a logical "offset" field associated with the file and a "block metadata record index" field. The "block metadata record index" field may store a reference (e.g., pointer) to a block metadata record, such as the example block metadata record shown in FIG. 6, which stores the physical address at which a data block associated with the logical "offset" of the file is stored at the underlying storage. If the value of the "Reference Count" field in the block metadata record is one, then it implies that just one leaf node included in a file references to that block metadata record and the physical data block with which that block metadata record is associated. However, if the value of the "Reference Count" field in the block metadata record is greater than one, then it implies that more than one leaf node included in one or more files reference to that block metadata record and the physical data block with which that block metadata record is associated. As will be described further below, in various embodiments, a write of a data block to a file will cause a leaf node of a tree representation of the file to include a block metadata record index that references the block metadata record that stores the physical address at which that data block is stored.

Figure 8:
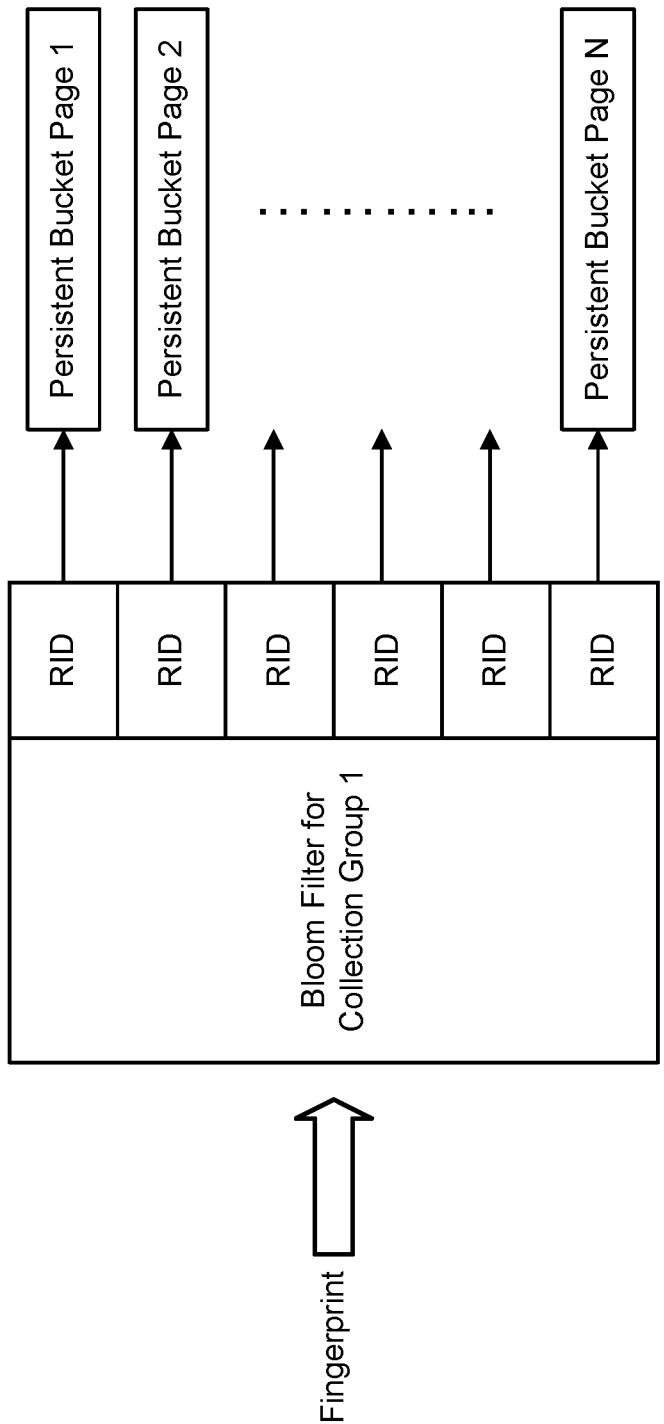
FIG. 8 is a diagram showing an example of a bloom filter associated with persistent bucket pages associated with a collection group.

FIG. 8 is a diagram showing an example of a bloom filter associated with persistent bucket pages associated with a collection group. In the example of FIG. 8, the bloom filter that is configured based on the fingerprints stored in N persistent bucket pages of Collection Group 1 is shown. As mentioned above, a bloom filter that corresponds to a data structure that stores deduplication data entries (e.g., a current delta page, a persistent delta page, or a set of persistent bucket pages) is configured such that the bloom filter outputs a record ID value (RID) that is associated with a particular persistent bucket page when it is possible that an input fingerprint is stored in the corresponding data structure that stores deduplication data entries and the bloom filter outputs another type of indication when the input fingerprint is not stored in the corresponding data structure that stores deduplication data entries. Each RID references (e.g., points to and/or stores an address of) a location in persistent storage at which a corresponding persistent bucket page is stored. To verify that an input fingerprint matches a fingerprint that is stored in an existing deduplication data entry of the corresponding persistent bucket page, the corresponding persistent bucket page is loaded from the persistent storage into memory and the input fingerprint is compared against the fingerprint stored in each existing deduplication data entry of the persistent bucket page to determine whether a matching fingerprint exists.

As mentioned above, in various embodiments, a bloom filter that corresponds to a data structure that stores deduplication data entries (e.g., a current delta page, a persistent delta page, or a set of persistent bucket pages) associated with a collection group is stored in memory so that the bloom filter can be quickly accessed and checked for a particular fingerprint. Then, if the bloom filter outputs that the input fingerprint is not present in the corresponding data structure(s), the corresponding data structure that stores deduplication data entries does not need to be checked, which increases the efficiency of searching through data structures that store deduplication data entries. In some embodiments, a single bloom filter is configured for each current delta page corresponding to a collection group. In some embodiments, a single bloom filter is configured for each persistent delta page corresponding to a collection group. In some embodiments, a single bloom filter is configured for the set of persistent bucket pages corresponding to a collection group.

A bloom filter false positive rate depends on two factors: the number of bits for each entry and the number of hash functions. A false positive rate is inversely proportional to the number of bits for each entry. However, an increasing number of hash functions beyond certain numbers can have a negative impact. Hence, there is an optimal number of hash functions that should be used. In various embodiments, a bloom filter that corresponds to a persistent data structure (e.g., a persistent delta page or a set of persistent bucket pages) comprises 6 bits per entry and uses 3 hash functions, which yields a 6% false positive.

While the bloom filter of FIG. 8 is shown for N persistent bucket pages of a collection group, similar bloom filters may be configured for a current delta page stored in memory for a collection group or for a persistent delta page stored in persistent storage for a collection group.

Figure 9:
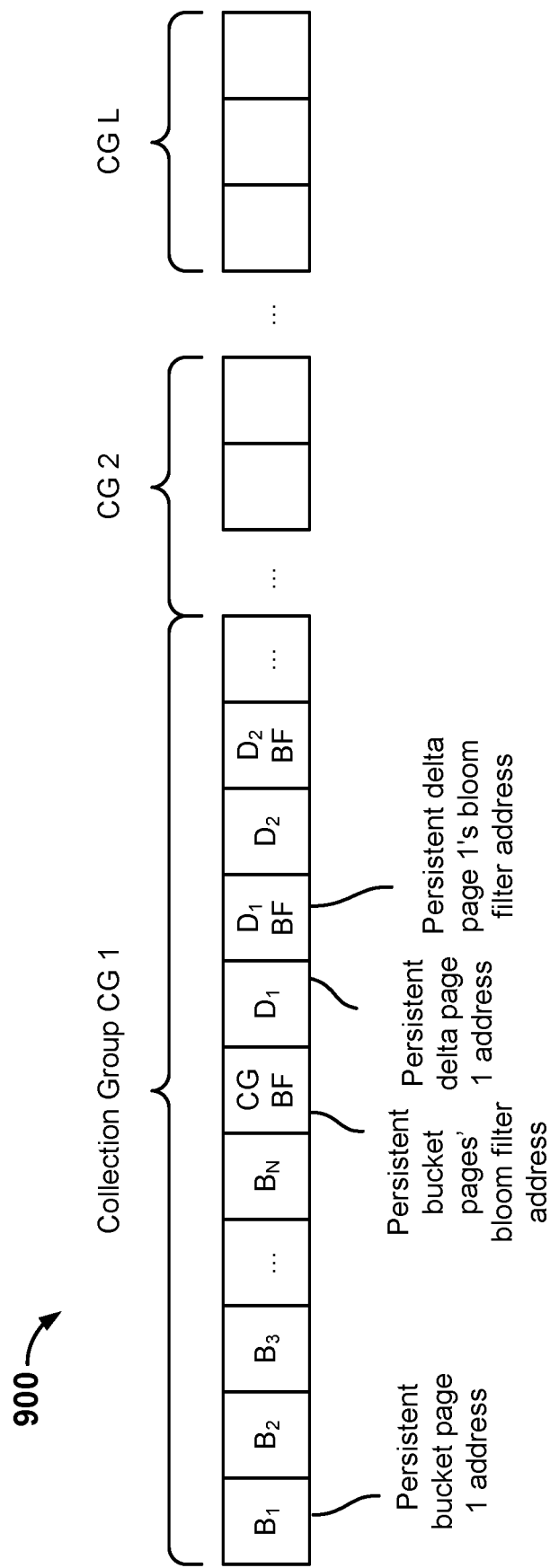
FIG. 9 is a diagram showing an example collection group address data structure in accordance to various embodiments.

FIG. 9 is a diagram showing an example collection group address data structure in accordance to various embodiments. In various embodiments, the address in either memory or persistent storage at which each data structure stores deduplication data entries (e.g., a current delta page, a persistent delta page, or a set of persistent bucket pages) and each bloom filter corresponds to such data structures for a collection group is stored in the collection group address data structure (e.g., array). For example, collection group address data structure 900 stores the addresses pertaining to Collection Group 1 corresponding to each persistent bucket page, the bloom filter that corresponds to the persistent bucket pages, each persistent delta page, and the bloom filter corresponding to each persistent delta page. Collection group address data structure 900 stores the address for the same data structures for each other collection group besides Collection Group 1. In various embodiments, collection group address data structure 900 may be updated when each new data structure that stores deduplication data entries (e.g., a current delta page, a persistent delta page, or a set of persistent bucket pages) and each corresponding bloom filter are generated.

In some embodiments, the collection group address data structure is stored in a transactional database (e.g., which is implemented at a persistent storage) as a value with the address of the collection group address index being the key corresponding to the value in a key-value pair. In various embodiments, the collection group address data structure may be retrieved to locate where a data structure that stores deduplication data entries (e.g., a current delta page, a persistent delta page, or a set of persistent bucket pages) and each corresponding bloom filter is stored in either memory or persistent storage. For example, the collection group address data structure may be retrieved after the storage system crashes and the data structures need to be located to recover new deduplication data entries that were lost from memory, as will be further described below. Also, for example, the collection group address data structure may be retrieved any time that a matching fingerprint is needed to be checked among the current delta page, the persistent delta page(s), or the set of persistent bucket page(s) to determine whether a new fingerprint insertion entry corresponding to a collection group is to be stored. Despite persistent delta pages and persistent bucket pages being stored across a potentially large address space on persistent storage, the collection group address data structure maintains its respective addresses in a single data structure, which facilitates fast access of the persistent pages.

Figure 10:
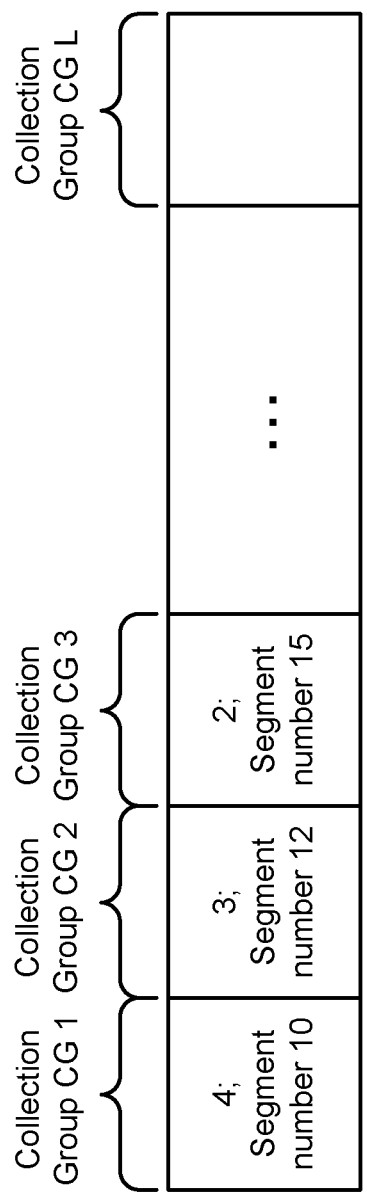
FIG. 10 is a diagram showing an example current delta page flush data structure in accordance to various embodiments.

FIG. 10 is a diagram showing an example current delta page flush data structure in accordance to various embodiments. In various embodiments, the current instance of the current delta page that is used for each collection group (since the previous merge operation) and the segment number of the segment to which the latest persistent delta page was written for that collection group are recorded in a corresponding element of the current delta page flush data structure. As shown in the example current delta page flush data structure of FIG. 10, Collection Group 1 has four persistent delta pages that have been generated since the previous merge operation. Furthermore, the third persistent delta page for Collection Group 1 was written to a segment that is numbered 10.

In some embodiments, the current delta page flush data structure is stored in a transactional database. For example, the current delta page flush data structure may be retrieved to determine the number of persistent delta pages that exist for each collection group (since the previous merge operation) and which segment to which the most recently persisted persistent delta page was written, such as after the storage system crashes and the data structures need to be located to recover new deduplication data entries that were lost from memory, as will be further described below.

Figure 11:
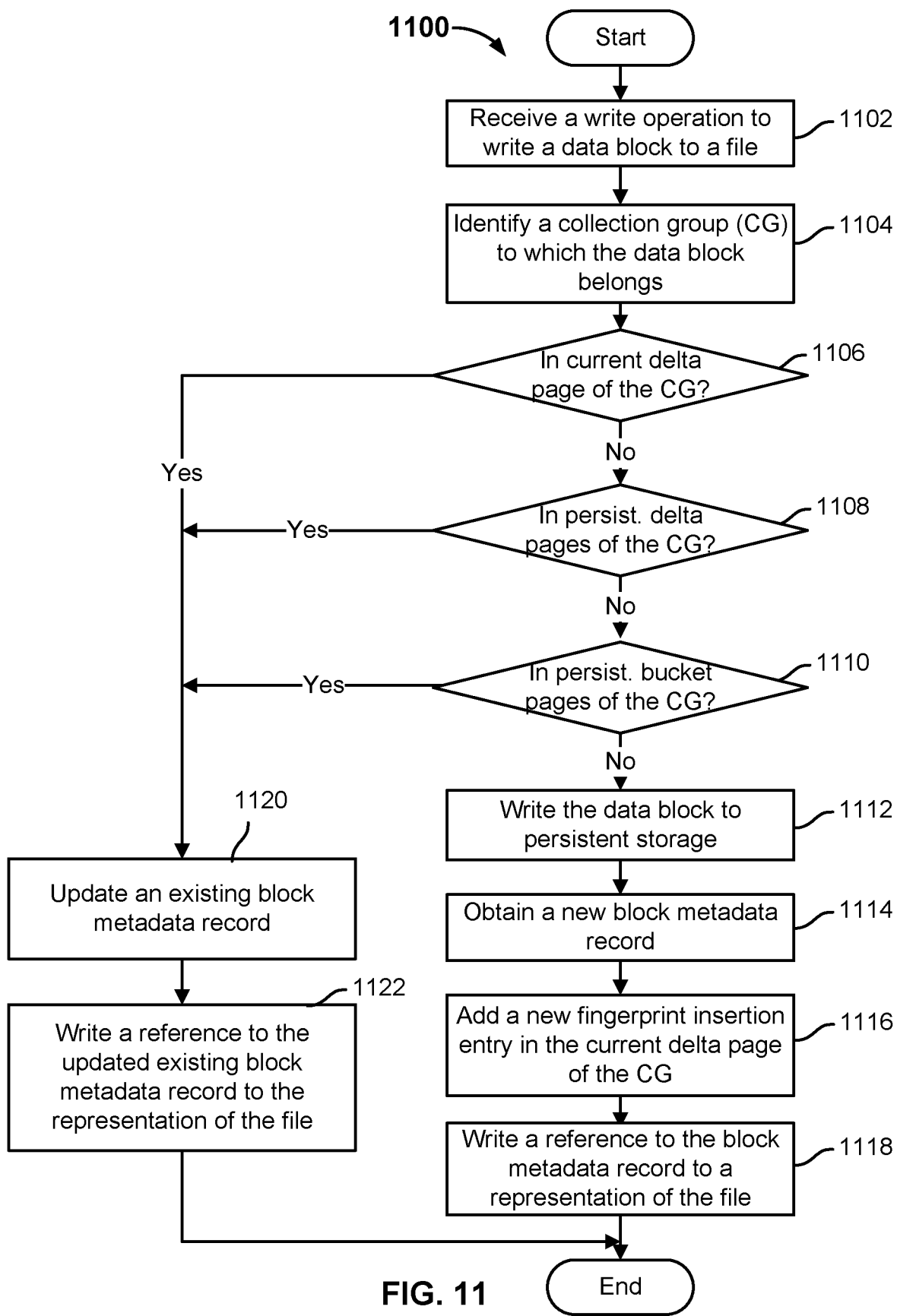
FIG. 11 is a flow diagram showing an example of a process for adding a new deduplication data entry to insert a new fingerprint.

FIG. 11 is a flow diagram showing an example of a process for adding a new deduplication data entry to insert a new fingerprint. In some embodiments, process 1100 is implemented at system 100 of FIG. 1.

Process 1100 describes one example process by which to add a new deduplication data entry associated with inserting a new fingerprint to the deduplication data stored for a collection group. Process 1100 describes a check being conducted against various data structures that store deduplication data entries for an identified collection group before adding a new deduplication data entry associated with inserting a new fingerprint to the collection group. As described in process 1100, all checking operations are confined to an identified collection group (as opposed to performed across multiple collection groups), which greatly reduces the scope of the search of a matching fingerprint.

At 1102, a write operation to write a data block to a file is received. The write operation includes a data block to be written to an identified file (or other object).

At 1104, a collection group (CG) to which the data block belongs is identified. A fingerprint is derived from the data block. For example, the fingerprint comprises a hash value (e.g., an SHA1) of the data block. In some embodiments, the fingerprint associated with the data block is referred to as a "key." The fingerprint of the data block is classified into a collection group by, for example, comparing the fingerprint to a table of ranges of values and corresponding collection groups, such as the example table shown in FIG. 4.

At 1106, it is determined whether a fingerprint associated with the data block is found in the current delta page corresponding to the collection group. In the event that the fingerprint associated with the data block is not found in the current delta page, control is transferred to 1108. Otherwise, in the event that the fingerprint associated with the data block is found in the current delta page, control is transferred to 1120.

The fingerprint of the data block is checked against the fingerprints stored in the new deduplication data entries that are stored in the collection group's current delta page that is maintained in memory. In various embodiments, prior to comparing the fingerprint of the data block against the fingerprints stored in the new deduplication data entries in the collection group's current delta page, the fingerprint is input into the in-memory bloom filter that corresponds to the current delta page to determine whether it is likely or not that the fingerprint could be stored in the current delta page. If the current delta page's bloom filter indicates that the current delta page does not store the fingerprint of the data block, then control may be transferred to 1108, without checking the current delta page itself. However, if the current delta page's bloom filter indicates that the current delta page may store the fingerprint of the data block, then the fingerprints included in the new deduplication data entries of the current delta page are checked to determine whether a matching fingerprint exists.

At 1108, it is determined whether the fingerprint associated with the data block is found in one of the persistent delta pages corresponding to the collection group. In the event that the fingerprint associated with the data block is not found in one of the persistent delta pages, control is transferred to 1110. Otherwise, in the event that the fingerprint associated with the data block is found in one of the persistent delta pages, control is transferred to 1120.

Because deduplication data entries in the persistent delta pages are newer than those in the persistent bucket pages, the persistent delta pages are checked before the persistent bucket pages. The fingerprint of the data block is checked against the fingerprints stored in the new deduplication data entries that are stored in the collection group's one or more persistent delta pages that are maintained in persistent storage. In the event that there are multiple persistent delta pages corresponding to the collection group, the fingerprint of the data block is first checked against the fingerprints stored in the new deduplication data entries stored in the persistent delta pages, in the reverse chronological order in which they were generated. As such, the fingerprint of the data block is first checked against the fingerprints stored in the new deduplication data entries stored in the most recently generated persistent delta page for the collection group. If no matching fingerprint is found in the most recently generated persistent delta page for the collection group, then the fingerprint of the data block is first checked against the fingerprints stored in the new deduplication data entries stored in the second most recently generated persistent delta page for the collection group, and so forth, until each persistent delta page for the collection group is checked, in reverse chronological order. If the fingerprint of the data block does not match any fingerprints stored in the new deduplication data entries of any of the persistent delta pages, then control is transferred to 1110.

In various embodiments, prior to comparing the fingerprint of the data block against the fingerprints stored in the new deduplication data entries in each of the collection group's persistent delta page, the fingerprint is input into the in-memory bloom filter that corresponds to the persistent delta page to determine whether it is likely or not that the fingerprint could be stored in that persistent delta page. If the persistent delta page's bloom filter indicates that the persistent delta page does not store the fingerprint of the data block, then the check may proceed to the in-memory bloom filter of the next persistent delta page, without checking the persistent delta page itself. However, if the persistent delta page's bloom filter indicates that the persistent delta page may store the fingerprint of the data block, then the persistent delta page is loaded from the persistent storage into the memory and the fingerprints included in the deduplication data entries of the persistent delta page are checked to determine whether a matching fingerprint exists. By only loading a persistent delta page into memory only after it is determined that its corresponding bloom filter had indicated that a fingerprint in question may be stored in that persistent delta page, the number of persistent delta pages that are loaded at a time into memory is limited to one.

At 1110, it is determined whether the fingerprint associated with the data block is found in one of the persistent bucket pages corresponding to the collection group. In the event that the fingerprint associated with the data block is not found in the one of the persistent bucket pages, control is transferred to 1112. Otherwise, in the event that the fingerprint associated with the data block is found in the one of the persistent bucket pages, control is transferred to 1120.

The fingerprint of the data block is checked against the fingerprints stored in the existing deduplication data entries that are stored in the collection group's one or more persistent bucket pages that are maintained in persistent storage. In various embodiments, prior to comparing the fingerprint of the data block against the fingerprints stored in the existing deduplication data entries in the collection group's persistent bucket pages, the fingerprint is input into the in-memory bloom filter that corresponds to the set of persistent bucket pages to determine whether it is likely or not that the fingerprint could be stored in that set of persistent bucket pages. If the persistent bucket pages' bloom filter indicates that the persistent bucket pages do not store the fingerprint of the data block, then control may be transferred to 1112. However, if the persistent delta page's bloom filter indicates that a persistent bucket page may store the fingerprint of the data block, then that persistent bucket page is loaded from the persistent storage into the memory and the fingerprints included in the deduplication data entries of the persistent bucket page are checked to determine whether a matching fingerprint exists. By only loading a persistent bucket page into memory only after it is determined that its corresponding bloom filter had indicated that a fingerprint in question may be stored in that persistent bucket page, the number of persistent bucket pages that are loaded at a time into memory is limited to one.

At 1112, the data block is written to persistent storage. If the fingerprint of the data block does not match any fingerprint stored in deduplication data entries stored across the collection group's current delta page, persistent delta pages, and persistent bucket pages, then it is determined that the data block associated with the write operation is not a duplicate/copy of any data block that has been previously stored at the storage system. As such, the underlying data of the data block is stored to persistent storage (e.g., SSD, HDD, or a hybrid of both).

At 1114, a new block metadata record is generated. In some embodiments, the physical address at which the data block is stored in the underlying persistent storage is stored in a new block metadata record. One advantage of using a block metadata record to keep track of the physical address at which the data block is stored in the underlying persistent storage is that the block metadata record may maintain other types of deduplication related information related to the data block. For example, as shown in the example layout of the block metadata record in FIG. 6, in addition to the physical address at which the data block is stored in the underlying persistent storage, a block metadata record may also store a reference count associated with the data block, and a partial fingerprint associated with the data block. In some embodiments, a block metadata record can be reused to store the physical addresses at which different data blocks are stored in the underlying persistent storage and as such, a block metadata record that had been used to store the physical address at which a corresponding data block is stored in the underlying persistent storage may be reused to store the physical address at which a different data block is stored if, for example, the previous data block had been deleted from the underlying persistent storage.

At 1116, a new fingerprint insertion entry is added in the current delta page corresponding to the collection group. A new deduplication data entry to add/insert the fingerprint of the data block associated with the write operation is added to the current delta page corresponding to the collection group such that the fingerprint could eventually be persistently stored for the collection group (e.g., after the contents of the current delta page are flushed to persistent storage as a persistent delta page and/or after the next merge operation is performed for the collection group).

At 1118, a reference to the block metadata record is written to a representation of the file. In some embodiments where a block metadata record stores the physical address at which the data block is stored in the underlying persistent storage, a reference to that block metadata record is stored in a corresponding logical offset/location in the file to which the data block is indicated by the write operation to be stored. For example, if the file were represented as a tree/hierarchy, such as the example representation of a file that is shown in FIG. 7, a reference to the block metadata record is written to a corresponding leaf node of the file.

At 1120, an existing block metadata record is updated. If the fingerprint of the data block does match a fingerprint that is stored in the deduplication data entries stored in one of the collection group's current delta page, persistent delta pages, or persistent bucket pages, then it is determined that the data block associated with the write operation is a duplicate/copy of a data block that has been previously stored at the storage system. In various embodiments, the existing block metadata record that stores the physical address at which a previously received copy of the data block is stored in the underlying persistent storage is referenced (e.g., pointed to) by the deduplication data entry (that was found in one of the collection group's current delta page, persistent delta pages, or persistent bucket pages) that is included in the matching fingerprint. The existing block metadata record is obtained and then its reference count is incremented by one.

At 1122, a reference to the updated block metadata record is written to the representation of the file. In some embodiments where a block metadata record stores the physical address at which the data block is stored in the underlying persistent storage, a reference to that block metadata record is stored in a corresponding logical offset/location in the file to which the data block is indicated by the write operation to be stored.

Figure 12A:
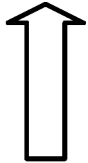
FIGS. 12A, 12B, and 12C describe an example of storing a new deduplication data entry for inserting a new fingerprint associated with a collection group.
Figure 12B:
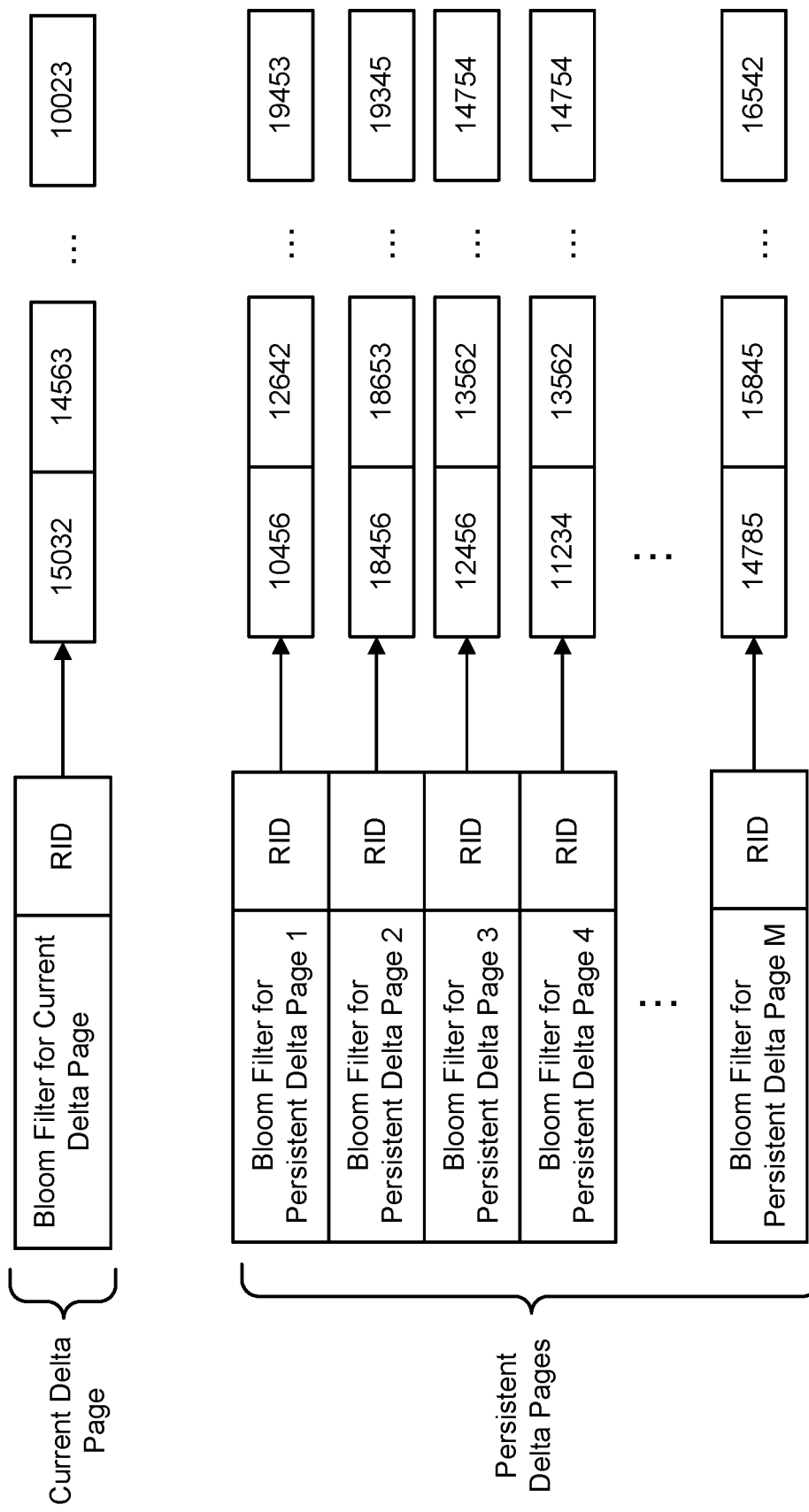
Figure 12C:
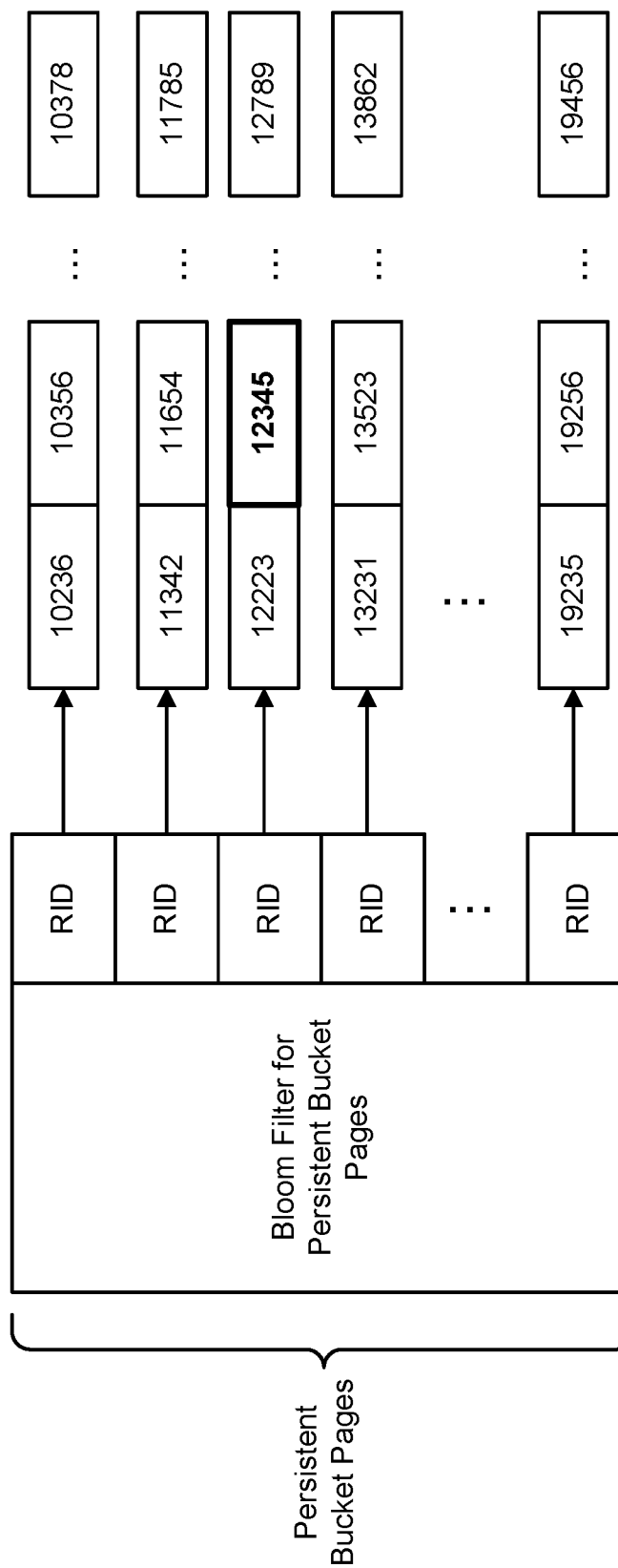

FIGS. 12A, 12B, and 12C describe an example of storing a new deduplication data entry for inserting a new fingerprint associated with a collection group.

FIG. 12A shows that a fingerprint associated with a data block that is included in a write operation is classified into a corresponding collection group. In the example associated with FIGS. 12A, 12B, and 12C, the fingerprint associated with the data block that is included in a write operation is "12345." In FIG. 12A, fingerprint "12345" is classified into a corresponding collection group by comparing at least a portion of the fingerprint to a table of ranges of fingerprint values and corresponding collection group numbers. In this example, fingerprint "12345" is classified into Collection Group 2, which is associated with fingerprints that are within the 10000-19999 value range. By classifying the fingerprint into a particular collection group, only the deduplication data entries of the identified collection group need to be checked for a matching fingerprint, as opposed to the deduplication data entries across multiple or all collection groups, which increases the speed and efficiency of the search for a matching fingerprint.

FIG. 12B shows that the fingerprint is looked for in the current delta page and the persistent delta pages of the corresponding collection group. First, the bloom filter of the current delta page of identified Collection Group 2 is checked for whether fingerprint "12345" is likely stored in the current delta page. Because the bloom filter of the current delta page of identified Collection Group 2 indicates that fingerprint "12345" is not stored in the current delta page, the bloom filter of the most recently generated persistent delta page (Persistent Delta Page 1) is next checked for whether fingerprint "12345" is likely stored in that persistent delta page. When the bloom filter of Persistent Delta Page 1 indicates that fingerprint "12345" is not stored in Persistent Delta Page 1, the bloom filter of the second most recently generated persistent delta page (Persistent Delta Page 2) is checked for whether fingerprint "12345" is likely stored in that persistent delta page. In this example, assume that the bloom filter corresponding to each persistent delta page is checked in the reverse chronological order in which the persistent delta pages are stored and it is determined that none of the persistent delta pages store fingerprint "12345."

FIG. 12C shows that the fingerprint is looked for in the persistent bucket page of the corresponding collection group. Because fingerprint "12345" was not found to be present in any of the current delta pages and the persistent delta pages of the corresponding collection group, the persistent bucket pages corresponding to Collection Group 2 are queried to determine whether fingerprint "12345" can be found in a persistent bucket page. The bloom filter of the set of persistent bucket pages of identified Collection Group 2 is checked for whether fingerprint "12345" is likely stored in a persistent bucket page. In this example, it is determined by the bloom filter of the set of persistent bucket pages of identified Collection Group 2 that the fingerprint "12345" is likely present in a persistent bucket page of Collection Group 2. Specifically, it is determined that the fingerprint "12345" may be present in the bucket page that is associated with fingerprint values in the 12000-12999 range. That persistent bucket page is then loaded from the persistent storage and into the memory and it is confirmed that fingerprint "12345" is in fact present in that persistent bucket page. The presence of the fingerprint "12345" in Collection Group 2 indicates that the data block corresponding to the fingerprint "12345" is already stored at the storage system and therefore, will not be redundantly stored again. As such, in some embodiments, a representation of the data block, such as a pointer to the location (e.g., physical address) at the storage system at which the data block was previously stored or a block metadata record that stores this physical address, is stored in the data structure of a file at which the data block is to be written. The reference count (e.g., included in the block metadata record that stores the physical address at which the data block is stored) associated with the data block is incremented by one.

Figure 13:
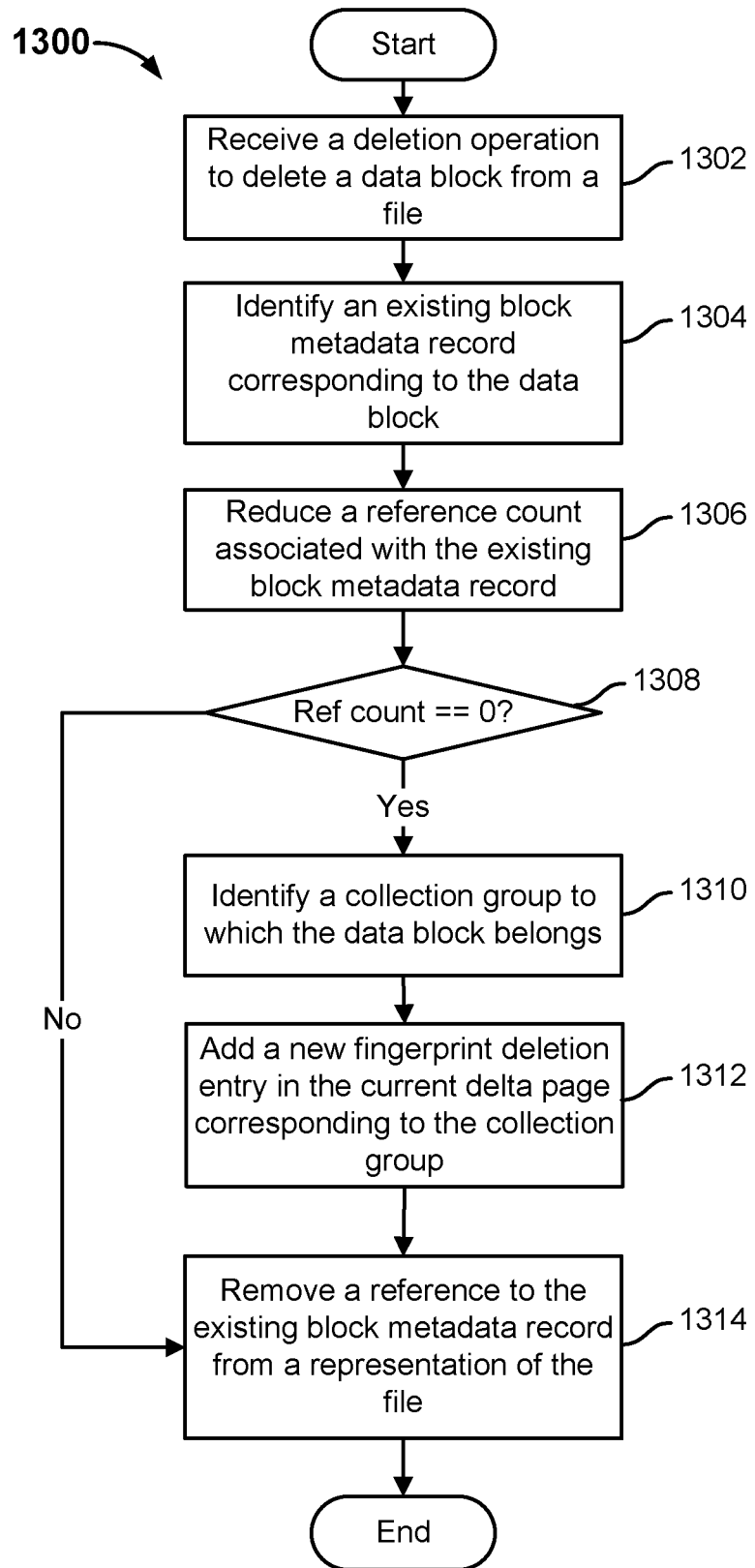
FIG. 13 is a flow diagram showing an embodiment of a process for adding a new deduplication data entry to delete a fingerprint.

FIG. 13 is a flow diagram showing an embodiment of a process for adding a new deduplication data entry to delete a fingerprint. In some embodiments, process 1300 is implemented at system 100 of FIG. 1.

Process 1300 describes one example process by which to add a new deduplication data entry associated with deleting an existing fingerprint from the deduplication data stored for a collection group. Process 1300 describes checking the updated reference count associated with a data block that is requested to be deleted before adding a new deduplication data entry associated with deleting an existing fingerprint from the deduplication data stored for the collection group.

At 1302, a delete operation to a delete a data block from a file is received. The deletion operation includes an identifier associated with a data block to be deleted, overwritten, or truncated from an identified file (or other object). For example, the deletion operation may include a logical offset associated with the data block to be deleted, overwritten, or truncated in the identified file (or other object).

At 1304, an existing block metadata record corresponding to the data block is identified. In some embodiments, the identifier associated with the data block that is included in the deletion operation is used to locate a corresponding leaf node of the representation (e.g., B+tree) of the identified file and the leaf node is used to locate the corresponding block metadata record associated with the data block.

At 1306, a reference count associated with the existing block metadata record is reduced. Because a reference to the block metadata record associated with the data block is (to be) deleted (at step 1314), the reference count associated with the data block is also reduced (e.g., decremented by one).

At 1308, it is determined whether a reference count associated with the existing block metadata record equals zero. In the event that the reference count associated with the existing block metadata record does not equal zero, control is transferred to 1314. Otherwise, in the event that the reference count associated with the existing block metadata record does equal zero, control is transferred to 1310. In some embodiments, after the block metadata record includes a reference count of zero for a particular fingerprint, that block metadata record will be reused to store the physical address at which a different data block is stored in the underlying persistent storage.

At 1310, a collection group to which the data block belongs is identified. A fingerprint is derived from the data block. For example, the fingerprint comprises a hash value (e.g., an SHA1) of the data block. In some embodiments, the fingerprint associated with the data block is referred to as a "key." The fingerprint of the data block is classified into a collection group by, for example, comparing the fingerprint to a table of ranges of values and corresponding collection groups, such as the example table shown in FIG. 4.

At 1312, a new fingerprint deletion entry is added to the current delta page corresponding to the collection group. A new deduplication data entry to delete the fingerprint of the data block (for which the reference count is zero) associated with the deletion operation is added to the current delta page corresponding to the collection group such that the fingerprint could eventually be removed from the fingerprints that are persistently stored for the collection group (e.g., after the contents of the current delta page are flushed to persistent storage as a persistent delta page and/or after the next merge operation is performed for the collection group).

At 1314, a reference to the existing block metadata record is removed from a representation of the file. Since the data block is requested to be deleted from the file, a reference to the block metadata record that stores the physical address at which the data block associated with the deletion operation is stored in the underlying persistent storage can be removed from the file's representation (e.g., B+tree).

Figure 14:
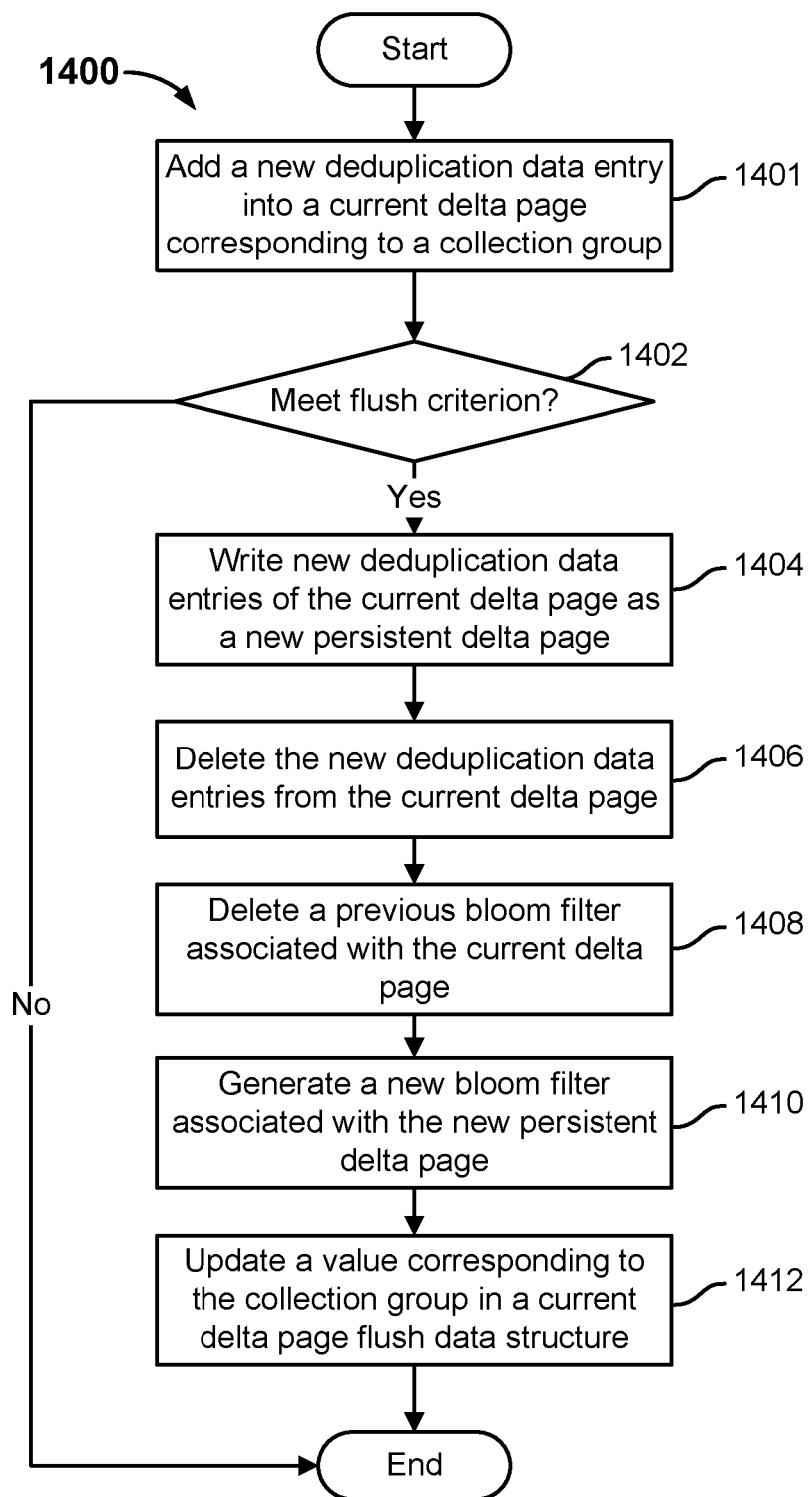
FIG. 14 is a flow diagram showing an embodiment of a process for flushing the contents of current delta pages to persistent storage.

FIG. 14 is a flow diagram showing an embodiment of a process for flushing the contents of current delta pages to persistent storage. In some embodiments, process 1400 is implemented at storage system 100 of FIG. 1.

Process 1400 describes an example process in which it is determined whether the current delta page, for which a new deduplication data entry was added, for a collection group meets a flush criterion and if so, the contents of that current delta page are flushed to a new persistent delta page for that collection group. The respective current delta pages corresponding to various collection groups may each meet the flush criterion at different times and therefore, the contents of such current delta pages may be flushed to persistent storage at different times.

At 1401, a new deduplication data entry is added into a current delta page corresponding to a collection group. For example, the new deduplication data entry may be a new fingerprint insertion entry added using a process such as process 1100 of FIG. 11 or it may be a new fingerprint deletion entry added using a process such as process 1300 of FIG. 13.

At 1402, it is determined whether the current delta page corresponding to the collection group meets a flush criterion. In the event that the current delta page of the collection group meets a flush criterion, control is transferred to 1404. Otherwise, in the event that the current delta page of the collection group does not meet a flush criterion, process 1400 ends. A first example flush criterion may be that the current delta page has stored a predetermined number (e.g., a maximum number of entries associated with the current delta page) of new deduplication data entries. A second example flush criterion may be that a predetermined interval of time has elapsed since the contents of the current delta page had previously been flushed to the persistent storage.

In various embodiments, the flush criterion associated with a collection group may be configured such that new deduplication data entries are flushed from the current delta page in memory to the persistent storage at a frequency that prevents a large number of new deduplication data entries from being stored in the memory prior to a flush operation. It is advantageous to minimize the number of deduplication data entries that are stored in memory because space in memory is scarce and because memory is a non-volatile form of storage, the contents thereof will be lost when the storage system experiences a crash or shutdown. Furthermore, by frequently flushing new deduplication data entries as persistent delta pages in persistent storage, the merge operation for a collection group, which is expensive for at least generating a high volume of disk IO, may be deferred for a much longer time than if new deduplication data entries could not be persisted other than to be merged with the existing deduplication data entries of the collection group's persistent bucket pages. Put another way, the flush criterion could be configured such that new deduplication data entries for a collection group could be checkpointed as persistent delta pages at a relatively small granularity.

At 1404, new deduplication data entries of the current delta page are written as a new persistent delta page. The new deduplication data entries of the current delta page are read from memory and then stored at a persistent storage (e.g., SSD) in a new data structure that is referred to as a new persistent delta page that is associated with the collection group.

In some embodiments, whereas new deduplication data entries were written to the current delta page in chronological order, the new deduplication data entries of the current delta page can be sorted based on a predetermined order (e.g., by increasing or decreasing fingerprint values) before they are written to the new persistent delta page. In some embodiments, those new deduplication data entries that are for inserting new fingerprints and those new deduplication data entries that are for deleting fingerprints of the current delta page are compared against each other prior to writing the new deduplication data entries to the new persistent delta page. In the first case, if a fingerprint deletion entry for a fingerprint is chronologically written before a fingerprint insertion entry for the same fingerprint, then it is assumed that the fingerprint deletion entry is intended to delete a previously stored instance of that fingerprint, and then both deduplication data entries are maintained and written to the new persistent delta page. In the second case, if a fingerprint insertion entry for a fingerprint is chronologically written before a fingerprint deletion entry for the same fingerprint, then neither deduplication data entries are written to the new persistent delta page.

At 1406, the new deduplication data entries are deleted from the current delta page. After the new deduplication data entries of the current delta page have been stored at the persistent storage, they can be removed (e.g., overwritten) from the current delta page in memory. The emptied current delta page may continue to store new deduplication data entries that are generated after the last flush event. Alternatively, the entire current delta page is deleted (e.g., overwritten) from memory and a new, empty current delta page is generated in memory to store new deduplication data entries that are generated after the last flush event.

At 1408, a previous bloom filter associated with the current delta page is deleted. Because a bloom filter cannot be modified to exclude a fingerprint on which it was configured, the bloom filter that was configured on the new deduplication data entries that were flushed from the current delta page are deleted from (e.g., overwritten in) memory.

At 1410, a new bloom filter associated with the new persistent delta page is generated. A new bloom filter is configured on the new deduplication data entries that are stored in the new persistent delta page. In various embodiments, the new bloom filter corresponding to the new persistent delta page is stored in memory to enable faster access to the bloom filter.

At 1412, a value corresponding to the collection group is updated in a current delta page flush data structure. The current delta page flush data structure, such as the example shown in FIG. 10, is updated to increment the value that indicates the current instance of the current delta page that is used for the collection group and to indicate the number of the segment to which the new persistent delta page was written.

Figure 15:
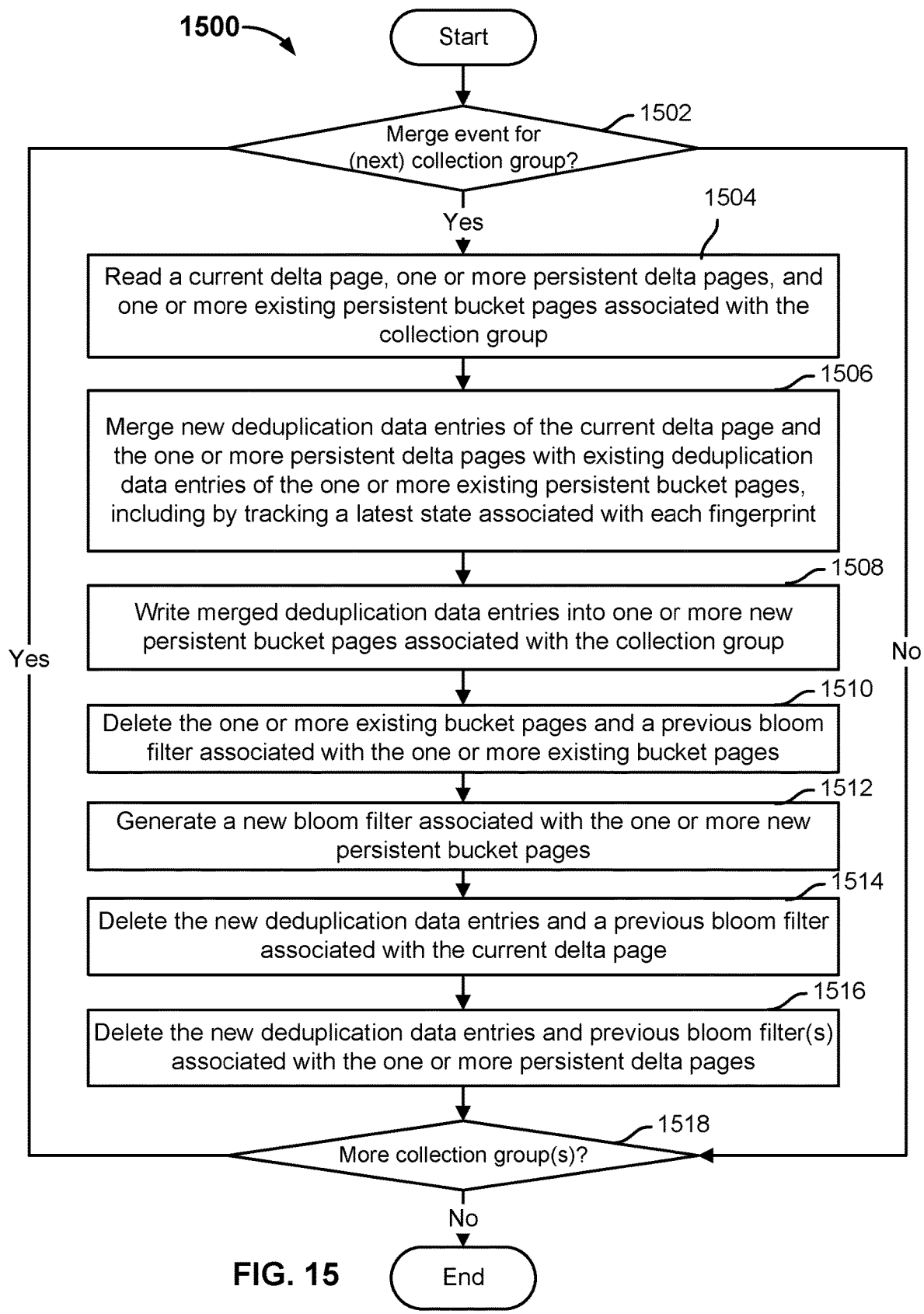
FIG. 15 is a flow diagram showing an embodiment of a process for performing a merge operation of the new deduplication data entries from current and persistent delta pages with the existing deduplication data entries from persistent bucket pages.

FIG. 15 is a flow diagram showing an embodiment of a process for performing a merge operation of the new deduplication data entries from current and persistent delta pages with the existing deduplication data entries from persistent bucket pages. In some embodiments, process 1500 is implemented at storage system 100 of FIG. 1.

Process 1500 describes an example process in which it is determined whether a merge event has occurred for a collection group and if so, merging the new deduplication data entries of that collection group's current delta page and persistent delta page(s) with the existing deduplication data entries from that collection group's persistent bucket page(s). Each of various collection groups may meet the merge event at different times and therefore, merge operations may be performed at different times for different collection groups. Because a merge operation is performed on a collection group basis, only a handful of persistent delta pages and persistent buckets pages need to be loaded into the main memory for each merge operation, which reduces memory overhead as well as the 10 load of the merge operation. Furthermore, by persisting new deduplication data entries as persistent delta pages that are to be merged with persistent bucket pages, the cost sorting deduplication data entries into their corresponding persistent bucket pages is delayed until the next merge operation.

At 1502, it is determined whether a merge event has occurred for a (next) collection group. As a first example, a merge event comprises the elapse of a predetermined interval of time. As a second example, a merge event comprises a predetermined number of persistent delta pages having been generated.

At 1504, a current delta page, one or more persistent delta pages, and one or more existing persistent bucket pages associated with the collection group are read. As described above, the current delta page of the collection group stores new (relative to a previous merge operation) deduplication data entries in memory, the persistent delta page(s) of the collection group store new (relative to the previous merge operation) deduplication data entries in persistent storage, and the persistent bucket page(s) of the collection group store existing (relative to the previous merge operation) deduplication data entries in persistent storage. While the new deduplication data of the current delta page and the persistent delta page(s) store fingerprint insertion entries and fingerprint deletion entries, the persistent bucket page(s) store only fingerprint insertion entries because all fingerprints that were indicated to be deleted by the fingerprint deletion entries were deleted in the previous merge operation. In some embodiments, the new deduplication data of the persistent delta page(s) and the existing deduplication data entries of the persistent bucket page(s) are loaded from persistent storage into memory to perform the merge operation.

At 1506, new deduplication data entries of the current delta page and the one or more persistent delta pages are merged with existing deduplication data entries of the one or more existing bucket pages, including by tracking a latest state associated with each fingerprint. In various embodiments, a latest (i.e., most recent) state of a fingerprint that is included in either a new deduplication data entry or an existing deduplication data entry is tracked by determining whether the most recently generated deduplication data entry that includes that fingerprint indicates to insert or to delete that fingerprint. If the latest state of the fingerprint is to insert that fingerprint, then a deduplication data entry to insert that fingerprint will be included among the merged deduplication data entries for the collection group. However, if the latest state of the fingerprint is to delete that fingerprint, then no deduplication data entry (to either insert or delete) of that fingerprint will be included among the merged deduplication data entries for the collection group.

At 1508, merged deduplication data entries are written into one or more new persistent bucket pages associated with the collection group. The merged deduplication data entries for the collection group form the body of deduplication data entries that will be stored in new persistent bucket pages for the collection group. For example, new persistent bucket pages for the collection group may sort the merged fingerprints by a sorting technique to improve the efficiency of subsequent lookups.

At 1510, a previous bloom filter associated with the one or more existing bucket pages is deleted. In various embodiments, because the existing persistent bucket pages are replaced with the new persistent bucket pages, the existing persistent bucket pages are deleted (e.g., reclaimed/overwritten). In various embodiments, because a bloom filter cannot be configured to exclude a fingerprint on which it had been configured, the bloom filter(s) that had been configured for the existing persistent bucket pages are deleted.

At 1512, a new bloom filter associated with the one or more new persistent bucket pages is generated. One or more new bloom filters are generated based on the merged deduplication data entries of the new persistent bucket pages.

At 1514, the new deduplication data entries and a previous bloom filter associated with the current delta page are deleted. Because the new deduplication data entries of the current delta page have already been merged with the existing deduplication data entries of the previous existing bucket pages, the current delta page is cleared and its previous bloom filter is deleted (e.g., reclaimed/overwritten).

At 1516, the new deduplication data entries and previous bloom filter(s) associated with the one or more persistent delta pages are deleted. Because the new deduplication data entries of the persistent delta pages have already been merged with the existing deduplication data entries of the previous existing bucket pages, the persistent delta pages are cleared (e.g., reclaimed/overwritten) and their previous bloom filters are deleted (e.g., reclaimed/overwritten).

At 1518, it is determined whether there is at least one more collection group for which the occurrence of a merge event has been determined. In the event that there is at least one more collection group to check, control returns to 1502. Otherwise, in the event that there is not at least one more collection group to check, process 1500 ends. Because steps 1504 through 1516 may be repeated for the current delta page of each collection group, it is determined at 1518 whether there are additional collection groups for which the merge operation should be performed.

Since persistent delta pages and persistent bucket pages (and their corresponding bloom filters, in some embodiments) are persistently stored and easily index-able, recovery of such data structures is almost instant. When a collection group is first time accessed, the relevant data that is accessed from the collection group is loaded into memory at that time. In some embodiments, the loaded data from a collection group stays in memory and may be quickly read by subsequent accesses to this data.

While bloom filters corresponding to persistent delta pages and persistent bucket pages are described in the examples above as being stored in memory for faster access, in some embodiments, to improve the efficiency with which data structures for storing deduplication data entries are recovered after a storage system crash, bloom filters corresponding to persistent delta pages and persistent bucket pages may be stored in persistent storage. This avoids the need to read all the persistent delta pages and persistent bucket pages in persistent storage to dynamically construct one or more bloom filters. In some embodiments in which the bloom filters corresponding to persistent delta pages and persistent bucket pages are stored in persistent storage, a bloom filter for a collection group is loaded from persistent storage into memory on first access and then cached for subsequent accesses. Hence, not all bloom filters need to be loaded upfront. This facilitates a faster instant recovery.

Figure 16:
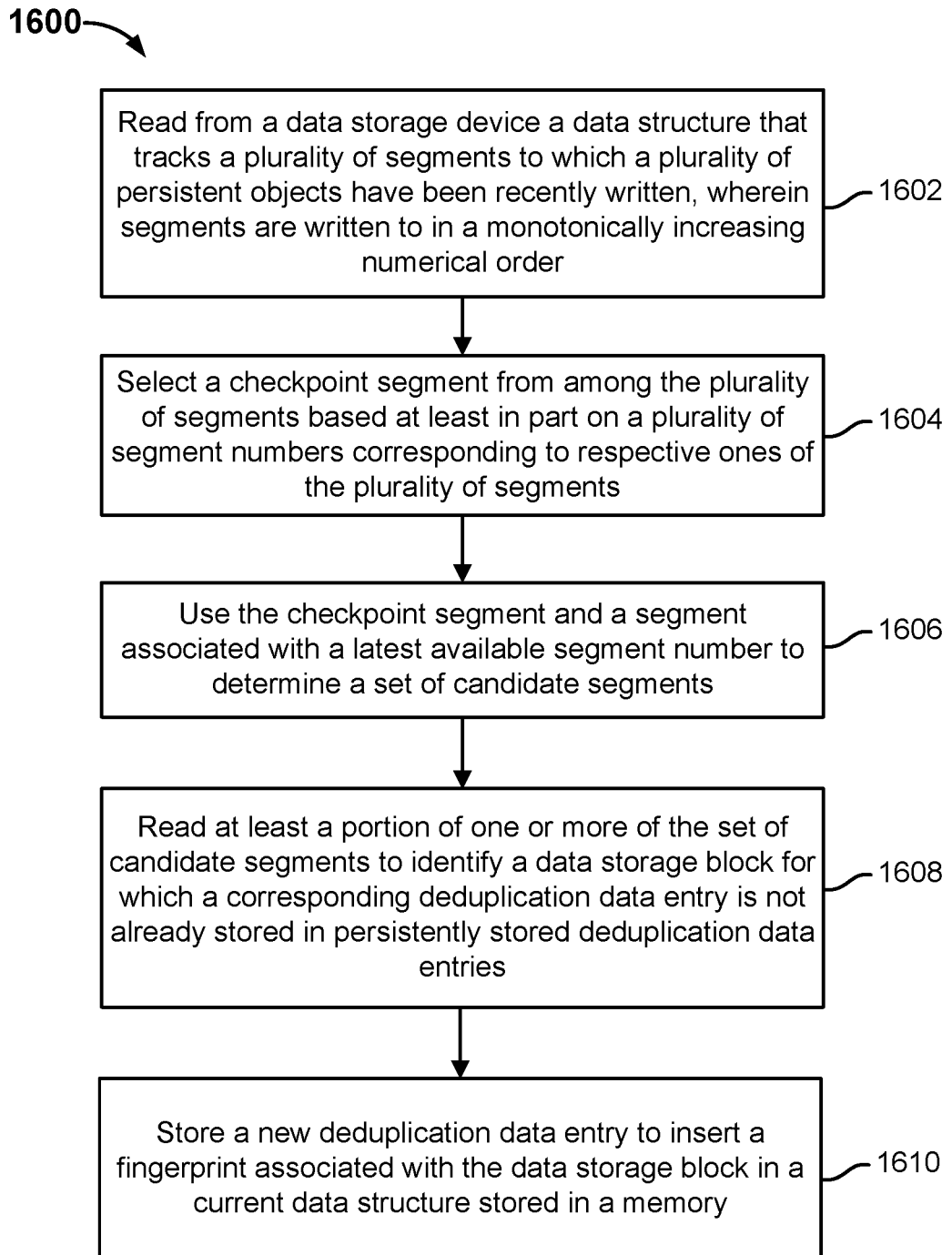
FIG. 16 is a flow diagram showing an embodiment of a process for recovering deduplication data entries for inserting new fingerprints that were lost from memory during a storage system crash.

FIG. 16 is a flow diagram showing an embodiment of a process for recovering deduplication data entries for inserting new fingerprints that were lost from memory during a storage system crash. In some embodiments, process 1600 is implemented at storage system 100 of FIG. 1.

Process 1600 describes an example process for recovering lost fingerprint insertion entries that had been stored in memory (in current delta pages) but were lost after a storage system crashed. In various embodiments, a "crash" of a storage system comprises any event (e.g., power failure, shutdown, or malfunction) that causes the contents of the non-volatile storage (e.g., memory) of the storage system to be lost. If fingerprint insertion entries that were lost from memory are not recovered, then data blocks whose fingerprints were lost among the entries could be redundantly stored at the storage system and therefore worsen the deduplication capabilities at the storage system.

At 1602, a data structure that tracks a plurality of segments to which a plurality of persistent objects have been recently written is read from a data storage device, wherein segments are written to in a monotonically increasing numerical order. In various embodiments, a data structure such as the current delta page flush data structure (for which an example is shown in FIG. 10) is retrieved from a data storage device with persistent storage. As shown in FIG. 10, the current delta flush data structure stores for each collection group, the current instance of the current delta page that is used for each collection group (since a previous merge operation) and the segment number of the segment to which the latest persistent delta page was written for that collection group. In various embodiments, after a system crash, the current delta page flush data structure is retrieved from the data storage device to implement the deduplication data entry recovery process. In some embodiments, the data storage device implements a (e.g., transactional) database that stores data as key-value pairs. For example, in storing the current delta page flush data structure, the key may comprise the address in the data storage device at which the data structure is stored and the corresponding value is the current delta page flush data structure itself.

At 1604, a checkpoint segment is selected from among the plurality of segments based at least in part on a plurality of segment numbers corresponding to respective ones of the plurality of segments. In various embodiments, the segment number of the segment to which the latest persistent delta page was written for that collection group is determined for every collection group and the lowest (smallest) value segment number is identified as the segment number of the "checkpoint segment." For a given collection group, since the segment number is recorded after writing the most recent persistent delta page, all persistent delta pages written to segments up to the checkpoint segment have been stored safely onto persistent storage. Since the smallest segment number amongst the segments that store the latest persistent delta page for each collection group is chosen as the "checkpoint segment," all the fingerprints that had been stored in memory prior to the crash (i.e., fingerprints that were not persisted as part of a persistent delta page or a persistent bucket page) must remain in segments greater than or equal to the "checkpoint segment."

At 1606, the checkpoint segment and a segment associated with a latest available segment number are used to determine a set of candidate segments. The segments associated with segment numbers from that of the checkpoint segment to that of the latest available segment, which is the segment to which persistent delta pages are written, are determined as the set of candidate segments that could store data blocks for which corresponding fingerprints had been lost from memory due to the storage system crash. Given that the new deduplication data entries stored in current delta pages in memory are frequently flushed to persistent storage and the current delta page flush data structure is correspondingly frequently updated, the set of candidate segments to scan should be relatively small.

At 1608, at least a portion of one or more of the set of candidate segments is read to identify a data storage block for which a corresponding deduplication data entry is not already stored in persistently stored deduplication data entries. The segments included in the set of candidate segments are each scanned and the fingerprints for all valid blocks are inserted back to the current delta pages corresponding to various collection groups.

In various embodiments, candidate segments are scanned for data blocks as follows: Each segment has a header that stores fingerprints (e.g., hash values) for the data blocks that have been written to that segment. During scanning of each candidate segment, the header portion of each segment is read and all the fingerprints are retrieved. Each of such retrieved fingerprints is checked against each persistent data structure (e.g., persistent delta page and persistent bucket page) associated with a corresponding collection group to determine whether a matching deduplication data entry for inserting such a fingerprint exists. If no such deduplication data entry exists, then a new fingerprint insertion entry to insert that scanned fingerprint is added into the current delta page (in memory) corresponding to the corresponding collection group. Because a segment may store fingerprints for any collection group, the scanning is not done on the basis of a particular collection group. Rather, for each fingerprint that is stored in a segment header, the persistent data structures of the collection group to which the fingerprint belongs are scanned.

At 1610, a new deduplication data entry to insert a fingerprint associated with the data storage block is stored in a current data structure stored in a memory.

Figure 17:
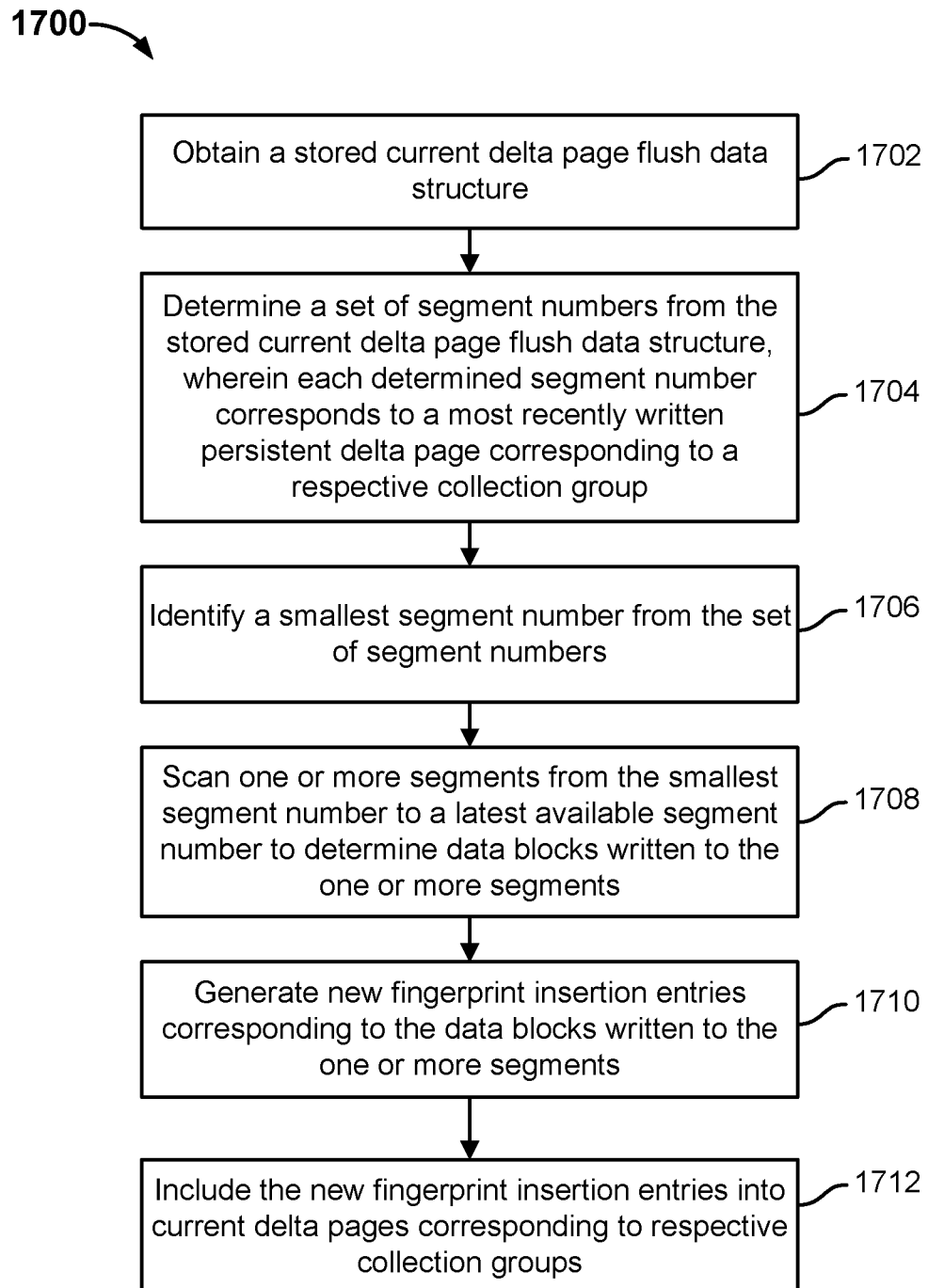
FIG. 17 is a flow diagram showing an example of a process for recovering deduplication data entries for inserting new fingerprints that were lost from memory during a storage system crash.

FIG. 17 is a flow diagram showing an example of a process for recovering deduplication data entries for inserting new fingerprints that were lost from memory during a storage system crash. In some embodiments, process 1700 is implemented at storage system 100 of FIG. 1. In some embodiments, process 1600 of FIG. 16 may be implemented using process 1700.

Process 1700 describes an example process for recovering lost fingerprint insertion entries that had been stored in memory (in current delta pages) but were lost after a storage system crashed.

At 1702, a stored current delta page flush data structure is obtained. In various embodiments, the current delta page flush data structure is retrieved from a (e.g., transactional) database.

At 1704, a set of segment numbers is determined from the stored current delta page flush data structure, wherein each determined segment number corresponds to a most recently written persistent delta page corresponding to a respective collection group. As shown in FIG. 10, the current delta flush data structure stores for each collection group, the current instance of the current delta page that is used for each collection group (since a previous merge operation) and the segment number of the segment to which the latest persistent delta page was written for that collection group.

Referring to the example current delta page flush data structure of FIG. 10, the segment number to which the latest persistent delta page was written for Collection Group 1 is 10, the segment number to which the latest persistent delta page was written for Collection Group 2 is 12, and the segment number to which the latest persistent delta page was written for Collection Group 3 is 15.

At 1706, a smallest segment number is identified from the set of segment numbers. The segment number with the lowest/smallest value from among all the segment numbers corresponding to various collection groups in the current delta page flush data structure is identified as the checkpoint segment. Since the segment number is recorded for a collection in the current delta page flush data structure after the most recent persistent delta page is written to a segment for that collection group, all persistent delta pages written to segments up to this segment have been stored safely onto persistent storage.

Referring to the example current delta page flush data structure of FIG. 10, if there are only three collection groups, Collection Groups 1, 2, and 3, then the smallest number is 10, which is the segment to which the latest persistent delta page was written for Collection Group 1, and so the segment with segment number 10 is identified as the checkpoint segment. It is therefore assumed that all persistent delta pages written to segments up to segment number 10 have been stored safely onto persistent storage.

At 1708, one or more segments are scanned from the smallest segment number to a latest available segment number to determine data blocks written to the one or more segments. The latest available segment number is associated with the segment that is last written to (e.g., with a persistent delta page of any collection group). Because the numbers of segments that are written to increase in a monotonic pattern of their segment numbers, the latest segment to be written to has the highest segment number of any segments that have been written to. In some embodiments, monotonically increasing segment numbers are present in a log structure file system. For example, step 1708 may be performed similarly to step 1608 of process 1600 of FIG. 16.

For example, if the checkpoint segment were segment number 10 and the latest available segment number is 17, then segments associated with numbers 10, 11, 12, 13, 14, 15, 16, and 17 would be scanned to determine valid data blocks for which fingerprints may have been lost from current delta pages that had been stored in memory prior to the storage system crash.

At 1710, new fingerprint insertion entries corresponding to the data blocks written to the one or more segments are generated. The fingerprints of valid data blocks that are scanned from the set of segments from the checkpoint segment to the latest available segment are generated.

At 1712, the new fingerprint insertion entries are included into current delta pages corresponding to respective collection groups. The fingerprint of a valid data block is classified into a collection group by, for example, comparing the fingerprint to a table of ranges of values and corresponding collection groups, such as the example table shown in FIG. 4. Each fingerprint is then added to that fingerprint's corresponding collection group as a new deduplication data entry for inserting that fingerprint in the collection group's new current delta page that is stored in memory.

Figure 18:
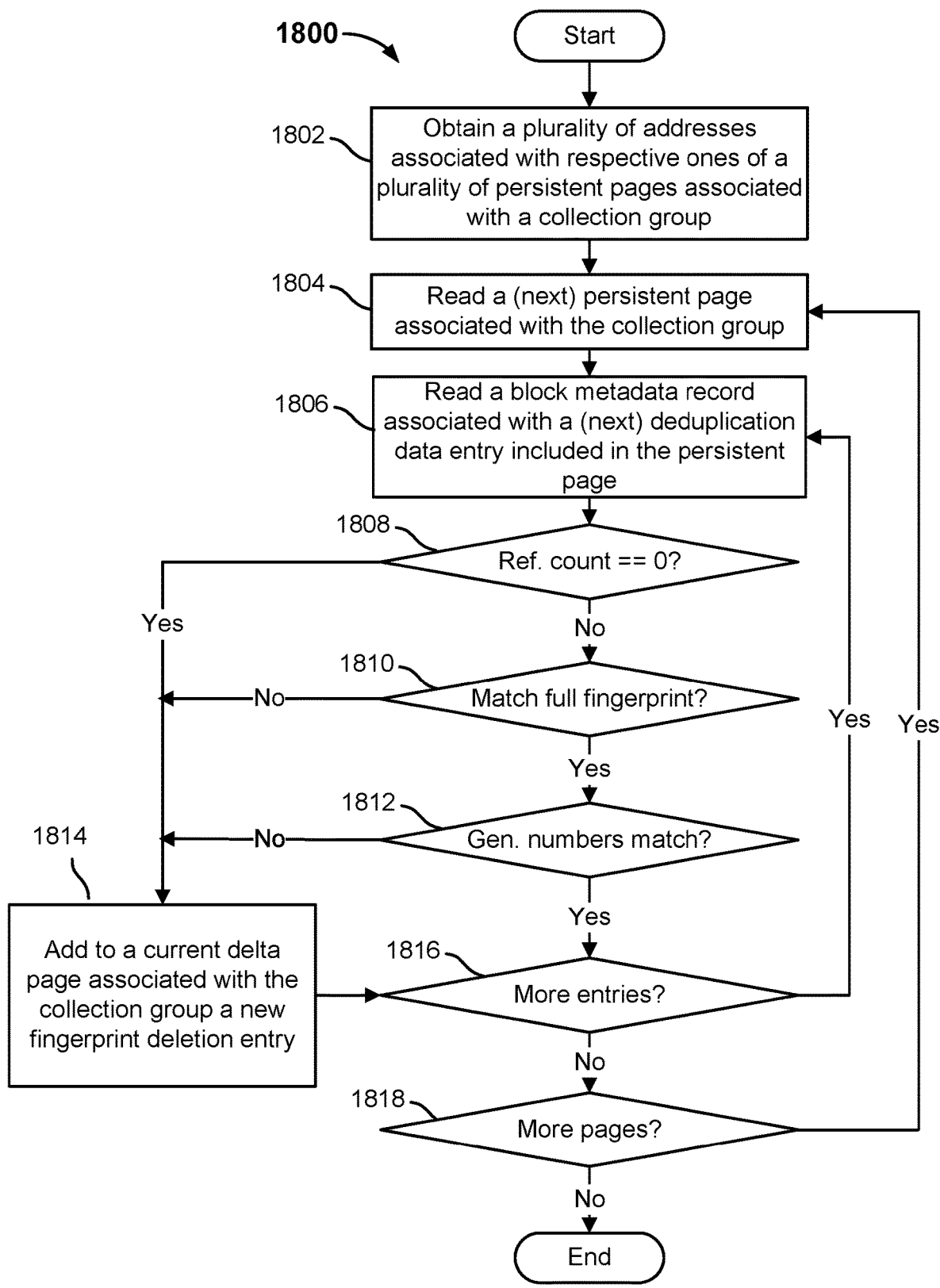
FIG. 18 is a flow diagram showing an example of a process for recovering deduplication data entries for deleting existing fingerprints that were lost from memory during a storage system crash.

FIG. 18 is a flow diagram showing an example of a process for recovering deduplication data entries for deleting existing fingerprints that were lost from memory during a storage system crash. In some embodiments, process 1800 is implemented at storage system 100 of FIG. 1.

Process 1800 describes an example process for recovering lost fingerprint deletion entries that had been stored in memory (in current delta pages) but were lost after a storage system crashed. If fingerprint deletion entries that were lost from memory are not recovered, all corresponding fingerprint insertion entries would remain in the collection group and waste valuable storage space.

At 1802, a plurality of addresses associated with respective ones of a plurality of persistent pages associated with a collection group is obtained. The persistent pages associated with a collection group include the persistent delta pages and the persistent bucket pages that are included in that collection group. A collection group address data structure (an example of which is shown in FIG. 9) stores the addresses in persistent storage in which the persistent delta pages and the persistent bucket pages that are included in each collection group are stored.

At 1804, a (next) persistent page associated with the collection group is read. A next either persistent delta page or persistent bucket page is read from the corresponding address recorded in the collection group address data structure.

At 1806, a block metadata record associated with a (next) deduplication data entry included in the persistent page is read. As described above, in various embodiments, each deduplication data entry stored in a current delta page, a persistent delta page, and/or a persistent bucket page stores a reference to a block metadata record and the block metadata record stores the physical address (e.g., on persistent storage) at which the underlying physical data of a data block is stored. In addition to storing the physical address (e.g., on persistent storage) at which the underlying physical data of a data block is stored, the block metadata record also stores other information related to the data block, including a reference count that indicates the number of (e.g., leaf nodes of) files that refer to that data block (by virtue of referring to that block metadata record). FIG. 5 shows an example of a persistent delta page or a persistent bucket page that stores multiple deduplication data entries and each entry includes a block metadata record index that refers to a corresponding block metadata record. FIG. 6 shows an example of a block metadata record. As will be described with steps 1808, 1810, and 1812 below, the contents of a block metadata record are compared to the contents of a deduplication data entry that is included in a persistent page to determine whether the data block associated with the deduplication data entry and the block metadata record has been deleted (e.g., marked for deletion) and therefore, a new deduplication data entry to delete the fingerprint associated with that data block was likely lost from memory during the storage system crash.

At 1808, it is determined whether a reference count of the block metadata record is equal to 0. In the event that the reference count of the block metadata record is equal to 0, control is transferred to 1814. Otherwise, in the event that the reference count of the block metadata record is not equal to 0, control is transferred to 1810. Because the reference count that is included in a block metadata record is decremented each time that the data block referenced by the block metadata record is removed from a file, if the reference count were zero, then it would indicate that the block metadata record is free and that the data block is no longer referenced by any files, is potentially already deleted from physical storage, and its fingerprint should be deleted from the data structures that store fingerprints for deduplication purposes. However, if the reference count were greater than zero, then it would indicate that the data block associated with the block metadata record is referenced by at least one file and that therefore, it is not clear whether the fingerprint of the data block should be deleted from the data structures that store fingerprints for deduplication purposes.

At 1810, it is determined whether a partial fingerprint in the block metadata record matches a full fingerprint in the deduplication data entry. In the event that the partial fingerprint in the block metadata record matches a full fingerprint in the deduplication data entry, control is transferred to 1812. Otherwise, in the event that the partial fingerprint in the block metadata record does not match a full fingerprint in the deduplication data entry, control is transferred to 1814. As shown in the example of a persistent page that is shown in FIG. 5, each deduplication data entry stores a full fingerprint of a data block and in the example of a block metadata record that is shown in FIG. 6, the block metadata stores a partial fingerprint of a data block. Because a block metadata record may be reused to store information associated with different data blocks over time, if the partial fingerprint of a data block that is stored by the block metadata record does not match the full fingerprint of a data block that is stored by the deduplication data entry of the persistent page, then it is inferred that the block metadata record no longer stores information pertaining to the same data block that is associated with the deduplication data entry and that the data block is potentially already deleted from physical storage and its fingerprint should be deleted from the data structures that store fingerprints for deduplication purposes. However, if the partial fingerprint of a data block that is stored by the block metadata record does match the full fingerprint of a data block that is stored by the deduplication data entry of the persistent page, then it is inferred that the block metadata record still stores information pertaining to the same data block that is associated with the deduplication data entry and that the fingerprint included in the deduplication data entry should not be deleted from the data structures that store fingerprints for deduplication purposes.

At 1812, it is determined whether a generation number in the block metadata record matches a generation number in the deduplication data entry. In the event that the generation number in the block metadata record matches the generation number in the deduplication data entry, control is transferred to 1816. Otherwise, in the event that the generation number in the block metadata record does not match the generation number in the deduplication data entry, control is transferred to 1814. Because a block metadata record may be reused to store information associated with different data blocks over time, each time the block metadata record is used to store information pertaining to a new data block, the generation number of the block metadata record increments by one. As such, if the generation number of the block metadata record that is included in the block metadata record does not match the generation number of the block metadata record that is included in the deduplication data entry of the persistent page, then it is inferred that the block metadata record no longer stores information pertaining to the same data block that is associated with the deduplication data entry and that the data block is potentially already deleted from physical storage and its fingerprint should be deleted from the data structures that store fingerprints for deduplication purposes. However, if the generation number of the block metadata record that is included in the block metadata record does match the generation number of the block metadata record that is included in the deduplication data entry of the persistent page, then it is inferred that the block metadata record still stores information pertaining to the same data block that is associated with the deduplication data entry and that the fingerprint included in the deduplication data entry should not be deleted from the data structures that store fingerprints for deduplication purposes.

At 1814, a new fingerprint deletion entry is added to a current delta page associated with the collection group. A new deduplication data entry to delete the fingerprint included in the deduplication data entry is added to the current delta page of the collection group such that during a later merge operation for the collection group, the fingerprint is to be deleted from the persistent page of the collection group.

At 1816, is it determined whether there are more deduplication data entries in the persistent page. In the event that there are more deduplication data entries in the persistent page, control is returned to 1806. Otherwise, in the event that there are not more deduplication data entries in the persistent page, control is transferred to 1818.

At 1818, is it determined whether there are more persistent pages associated with the collection group. In the event that there are more persistent pages associated with the collection group, control is returned to 1804. Otherwise, in the event that there are not more persistent pages associated with the collection group, process 1800 ends.

Figure 19:
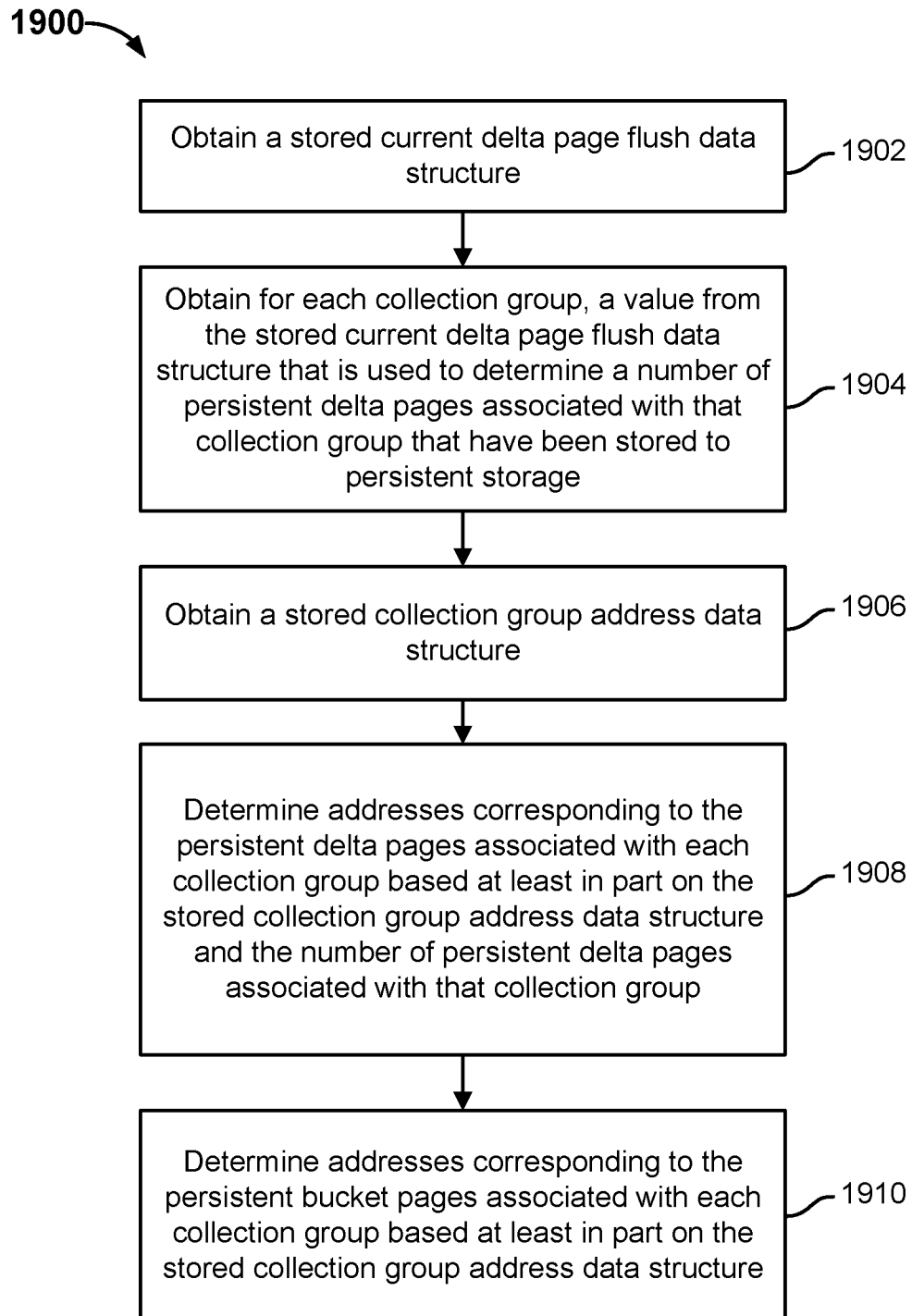
FIG. 19 is a flow diagram showing an example of a process for obtaining information associated with data structures that track deduplication data entries.

FIG. 19 is a flow diagram showing an example of a process for obtaining information associated with data structures that track deduplication data entries. In some embodiments, process 1900 is implemented at storage system 100 of FIG. 1.

Process 1900 describes an example process for obtaining information including the number of persistent delta pages that are stored for each collection group at persistent storage and also the address on persistent storage at which each persistent delta page or persistent bucket page corresponding to each collection group is stored. The obtained addresses of the persistent delta pages and persistent bucket pages for each collection group may be stored in memory and used to recover deduplication data entries that are lost from memory (e.g., due to a storage system crash), store new deduplication data entries in the current delta pages, and/or perform a merge operation.

At 1902, a stored current delta page flush data structure is obtained. A current delta page flush data structure (an example of which is shown in FIG. 10), which is stored in persistent storage, stores for each collection group, the current instance of the current delta page that is used for each collection group (since a previous merge operation) and the segment number of the segment to which the latest persistent delta page was written for that collection group.

At 1904, for each collection group, a value is obtained from the stored current delta page flush data structure that is used to determine a number of persistent delta pages associated with that collection group that have been stored to persistent storage. For each collection group, a value associated with the current instance of the current delta page that is used for that collection group (since a previous merge operation) is determined. That value indicates the number of times that the contents of that current delta page have been flushed to persistent storage as persistent delta pages. Therefore, the value associated with the current instance of the current delta page that is used for a collection group indicates the number of persistent delta pages that are stored on persistent storage for the collection group. For example, if the current delta page flush data structure stored "5" as the value associated with the current instance of the current delta page that is used for a collection group, then it is determined that five persistent delta pages have been stored for that collection group at the persistent storage.

At 1906, a stored collection group address data structure is obtained. A collection group address data structure (an example of which is shown in FIG. 9), which is stored in persistent storage, stores for each collection group (since a previous merge operation) the addresses in persistent storage in which the persistent delta pages and the persistent bucket pages that are included in that collection group are stored.

At 1908, addresses corresponding to the persistent delta pages associated with each collection group are determined based at least in part on the stored collection group address data structure and the number of persistent delta pages associated with that collection group. As shown in the example collection group address data structure in FIG. 9, the address (e.g., location in persistent storage) at which each persistent bucket page is stored and each persistent bucket page that corresponds to a particular collection group is stored, is included in a corresponding element of the data structure. For example, if it were determined using the current delta page flush data structure that Collection Group 1 has four persistent delta pages, then the respective addresses of four persistent delta pages associated with Collection Group 1 would be read from the collection group address data structure.

At 1910, addresses corresponding to the persistent bucket pages associated with each collection group are determined based at least in part on the stored collection group address data structure. The address of each persistent bucket page that corresponds to a particular collection group is also read from the collection group address data structure.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a memory configured to store a first current data structure and a second current data structure; and
a processor coupled to the memory, the processor is configured to:
use the first current data structure to track a first set of deduplication data entries associated with a first collection group, wherein respective fingerprints of the first set of deduplication data entries associated with the first collection group are associated with a first common attribute, wherein respective fingerprints of a second set of deduplication data entries associated with a second collection group are associated with a second common attribute, wherein the first common attribute is different from the second common attribute;
determine a flush criterion associated with the first current data structure has been met; and
in response to the determination that the flush criterion associated with the first current data structure has been met, store the first set of deduplication data entries of the first current data structure as one or more persistent objects associated with the first collection group in a persistent storage, wherein the one or more persistent objects are usable to update a set of persistently stored metadata associated with the first collection group that tracks deduplication data entries associated with the first collection group generated before a previous merge operation associated with the first collection group.

2. The system of claim 1, wherein the memory is further configured to store a bloom filter corresponding to the first current data structure, wherein the bloom filter is configured based at least in part on the first set of deduplication data entries tracked by the first current data structure.

3. The system of claim 1, wherein the processor is further configured to:
receive a write operation to write a data storage block to a file;
determine that the data storage block belongs to the first collection group;
determine that a fingerprint associated with the data storage block does not match fingerprints stored in the first current data structure, in the one or more persistent objects, or the set of persistently stored metadata; and
add to the first current data structure a new deduplication data entry to insert the fingerprint associated with the data storage block.

4. The system of claim 3, wherein the processor is further configured to:
write the data storage block to the persistent storage;
generate a new block metadata record, wherein the new block metadata record stores an address in the persistent storage at which the data storage block is stored; and
write a reference to the new block metadata record to a representation associated with the file.

5. The system of claim 1, wherein the processor is further configured to:
receive a write operation to write a data storage block to a file;
determine that the data storage block belongs to the first collection group;
determine that a fingerprint associated with the data storage block matches a stored fingerprint in one of the first current data structure, the one or more persistent objects, and the set of persistently stored metadata;
update an existing block metadata record associated with a previously stored copy of the data storage block; and
write a reference to the existing block metadata record to a representation associated with the file.

6. The system of claim 1, wherein the processor is further configured to:
receive a write operation to write a data storage block to a file;
determine a fingerprint associated with the data storage block;
compare the fingerprint to a bloom filter corresponding to a first persistent object included in the one or more persistent objects; and
in response to a determination that the bloom filter indicates that the fingerprint is potentially stored in the first persistent object:
load the first persistent object into the memory; and
compare the fingerprint to one or more fingerprints stored in the first persistent object.

7. The system of claim 1, wherein the processor is further configured to:
receive a deletion operation to delete a data storage block from a file;
update a reference count associated with the data storage block;
determine that the reference count equals zero; and
in response to the determination that the reference count equals zero, insert a new fingerprint deletion entry into the first current data structure.

8. The system of claim 7, wherein the processor is further configured to:
update an existing block metadata record associated with a previously stored copy of the data storage block; and
remove a reference to the existing block metadata record from a representation associated with the file.

9. The system of claim 1, wherein the processor is further configured to:
determine that a merge event has occurred for the first collection group; and
in response to the merge event, perform a new merge operation for the first collection group, including to:
merge the first set of deduplication data entries tracked by the first current data structure and one or more sets of deduplication data entries tracked by the one or more persistent objects with the deduplication data entries generated before the previous merge operation tracked by the set of persistently stored metadata; and
write merged deduplication data entries into a new set of persistently stored metadata.

10. The system of claim 9, wherein to merge the first set of deduplication data entries tracked by the first current data structure and the one or more sets of deduplication data entries tracked by the one or more persistent objects with the deduplication data entries generated before the previous merge operation tracked by the set of persistently stored metadata includes to track a latest state associated with each fingerprint.

11. The system of claim 9, wherein the processor is further configured to:
delete the set of persistently stored metadata and a previous bloom filter corresponding to the set of persistently stored metadata;
generate a new bloom filter associated with the new set of persistently stored metadata;

delete the first set of deduplication data entries tracked by the first current data structure and a previous bloom filter corresponding to the first current data structure; and
delete the one or more sets of deduplication data entries tracked by the one or more persistent objects and one or more previous bloom filters corresponding to the one or more persistent objects.

12. The system of claim 1, wherein the system further comprises the persistent storage and wherein the persistent storage comprises a solid state drive (SSD).

13. The system of claim 1, wherein the one or more persistent objects track one or more sets of deduplication data entries that have been generated after the previous merge operation.

14. A method, comprising:
using a first current data structure to track a first set of deduplication data entries associated with a first collection group, wherein respective fingerprints of the first set of deduplication data entries associated with the first collection group are associated with a first common attribute, wherein respective fingerprints of a second set of deduplication data entries associated with a second collection group are associated with a second common attribute, wherein the first common attribute is different from the second common attribute;
determining a flush criterion associated with the first current data structure has been met; and
in response to the determination that the flush criterion associated with the first current data structure has been met, storing the first set of deduplication data entries of the first current data structure as one or more persistent objects associated with the first collection group in a persistent storage, wherein the one or more persistent objects are usable to update a set of persistently stored metadata associated with the first collection group that tracks deduplication data entries associated with the first collection group generated before a previous merge operation associated with the first collection group.

15. The method of claim 14, further comprising:
receiving a write operation to write a data storage block to a file;
determining that the data storage block belongs to the first collection group;
determining that a fingerprint associated with the data storage block does not match fingerprints stored in the first current data structure, in the one or more persistent objects, or the set of persistently stored metadata; and
adding to the first current data structure a new deduplication data entry to insert the fingerprint associated with the data storage block.

16. The method of claim 14, further comprising:
receiving a write operation to write a data storage block to a file;
determining that the data storage block belongs to the first collection group;
determining that a fingerprint associated with the data storage block matches a stored fingerprint in one of the first current data structure, the one or more persistent objects, and the set of persistently stored metadata;
updating an existing block metadata record associated with a previously stored copy of the data storage block; and
writing a reference to the existing block metadata record to a representation associated with the file.

17. The method of claim 14, further comprising:
receiving a write operation to write a data storage block to a file;
determining a fingerprint associated with the data storage block;
comparing the fingerprint to a bloom filter corresponding to a first persistent object included in the one or more persistent objects; and
in response to a determination that the bloom filter indicates that the fingerprint is potentially stored in the first persistent object:
loading the first persistent object into a memory; and
comparing the fingerprint to one or more fingerprints stored in the first persistent object.

18. The method of claim 14, further comprising:
determining that a merge event has occurred for the first collection group; and
in response to the merge event, performing a new merge operation for the first collection group, including:
merging the first set of deduplication data entries tracked by the first current data structure and one or more sets of deduplication data entries tracked by the one or more persistent objects with the deduplication data entries generated before the previous merge operation tracked by the set of persistently stored metadata; and
writing merged deduplication data entries into a new set of persistently stored metadata.

19. The method of claim 14, wherein a memory is further configured to store a bloom filter corresponding to the first current data structure, wherein the bloom filter is configured based at least in part on the first set of deduplication data entries tracked by the first current data structure.

20. A computer program product, the computer program product being embodied in a non-transitory computer readable storage medium and comprising computer instructions for:
using a first current data structure to track a first set of deduplication data entries associated with a first collection group, wherein respective fingerprints of the first set of deduplication data entries associated with the first collection group are associated with a first common attribute, wherein respective fingerprints of a second set of deduplication data entries associated with a second collection group are associated with a second common attribute, wherein the first common attribute is different from the second common attribute;
determining a flush criterion associated with the first current data structure has been met; and
in response to the determination that the flush criterion associated with the first current data structure has been met, storing the first set of deduplication data entries of the first current data structure as one or more persistent objects associated with the first collection group in a persistent storage, wherein the one or more persistent objects are usable to update a set of persistently stored metadata associated with the first collection group that tracks deduplication data entries associated with the first collection group generated before a previous merge operation associated with the first collection group.

* * * * *